United States Patent
Kato et al.

(10) Patent No.: US 12,244,358 B2
(45) Date of Patent: Mar. 4, 2025

(54) COMMUNICATION APPARATUS AND COMMUNICATION METHOD

(71) Applicant: Murata Manufacturing Co., Ltd., Nagaokakyo (JP)

(72) Inventors: Noboru Kato, Nagaokakyo (JP); Yoichi Saito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 362 days.

(21) Appl. No.: 17/660,089

(22) Filed: Apr. 21, 2022

(65) Prior Publication Data

US 2022/0247502 A1 Aug. 4, 2022

Related U.S. Application Data

(63) Continuation of application No. PCT/JP2020/033991, filed on Sep. 8, 2020.

(30) Foreign Application Priority Data

Dec. 24, 2019 (JP) ................. 2019-232941

(51) Int. Cl.
*H04B 17/14* (2015.01)
*H04B 17/318* (2015.01)

(52) U.S. Cl.
CPC ........... *H04B 17/14* (2015.01); *H04B 17/318* (2015.01)

(58) Field of Classification Search
CPC .. H04B 17/14; H04B 17/318; G06K 7/10336; G06K 7/10356; G06K 7/10455
See application file for complete search history.

(56) References Cited

U.S. PATENT DOCUMENTS

2004/0253818 A1 12/2004 Okamoto et al.
2005/0092836 A1* 5/2005 Kudo ................. G06K 7/10336
235/436

(Continued)

FOREIGN PATENT DOCUMENTS

JP 2004220141 A 8/2004
JP 2009258839 A * 11/2009

(Continued)

OTHER PUBLICATIONS

International Search Report issued for PCT/JP2020/033991, date of mailing Nov. 10, 2020.

(Continued)

*Primary Examiner* — Raymond S Dean
(74) *Attorney, Agent, or Firm* — ArentFox Schiff LLP

(57) ABSTRACT

A communication device for communicating with wireless communication devices is provided that includes a shield device defining a plurality of shield spaces arranged along a transport path transporting a sheet on which a plurality of wireless communication devices are arrayed; and a plurality of reader/writer antennas arranged in each of the plurality of shield spaces. Moreover, the plurality of shield spaces are juxtaposed corresponding to an array pitch between the wireless communication devices on the sheet, a part of the shield device is arranged between the plurality of reader/writer antennas, and the plurality of reader/writer antennas are arranged at a side facing a transport surface of the transport path.

20 Claims, 22 Drawing Sheets

(56) References Cited

U.S. PATENT DOCUMENTS

| | | | |
|---|---|---|---|
| 2006/0022798 A1* | 2/2006 | Akiyama | G06K 19/0723 340/10.1 |
| 2006/0258025 A1 | 11/2006 | Okamoto et al. | |
| 2007/0055470 A1* | 3/2007 | Pietrzyk | G05B 19/05 702/104 |
| 2007/0200705 A1* | 8/2007 | Yamagajo | H01Q 1/2225 340/572.7 |
| 2009/0283599 A1 | 11/2009 | Okamoto et al. | |
| 2013/0293356 A1* | 11/2013 | Mukai | G06K 7/10465 340/10.1 |
| 2016/0353619 A1* | 12/2016 | Kato | H01Q 1/2208 |
| 2018/0137399 A1* | 5/2018 | Kato | G06K 19/07771 |
| 2019/0280366 A1 | 9/2019 | Kato | |

FOREIGN PATENT DOCUMENTS

| | | |
|---|---|---|
| JP | 2012226576 A | 11/2012 |
| WO | 2019065957 A1 | 4/2019 |

OTHER PUBLICATIONS

Written Opinion of the International Searching Authority issued in PCT/JP2020/033991, date of mailing Nov. 10, 2020.

* cited by examiner

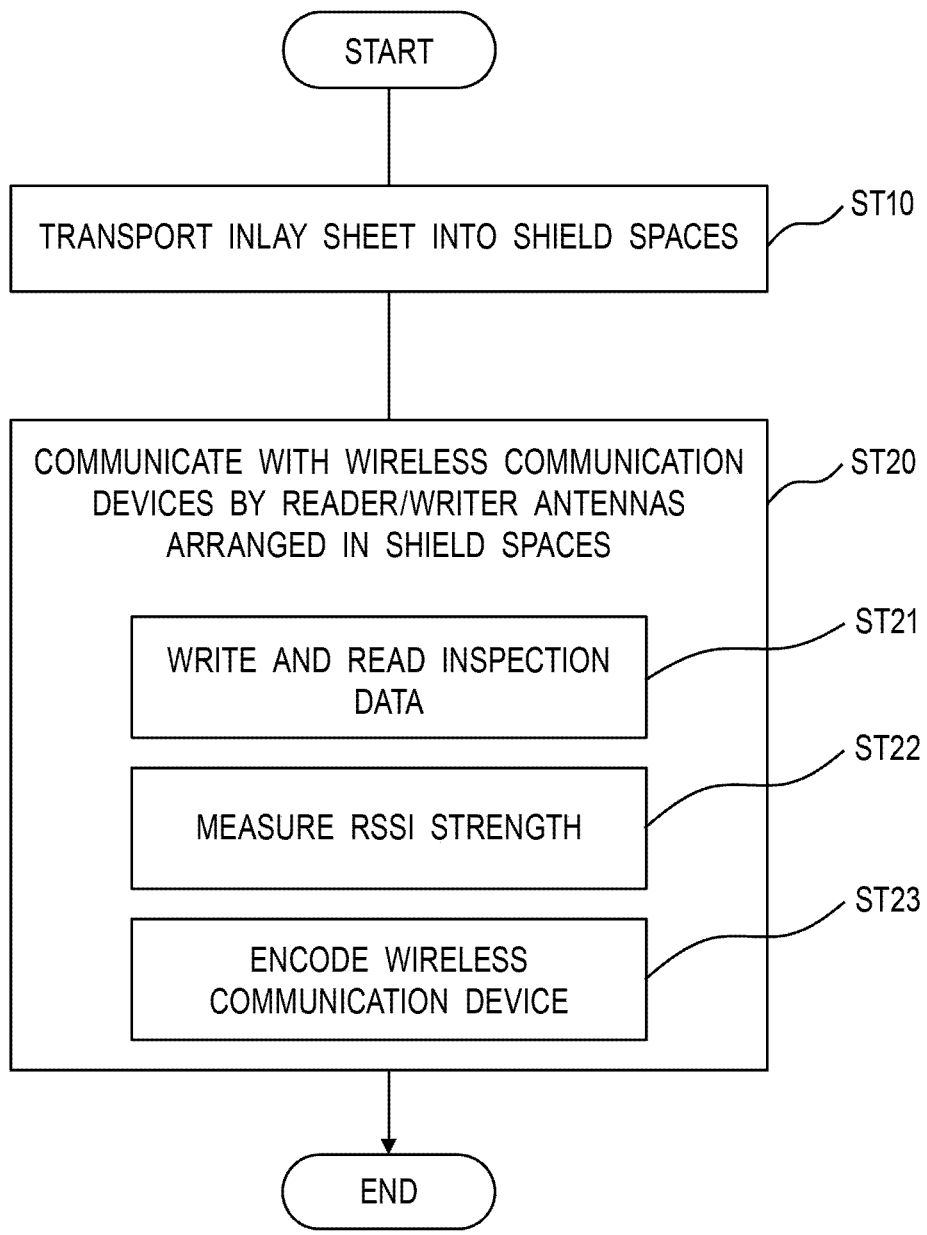

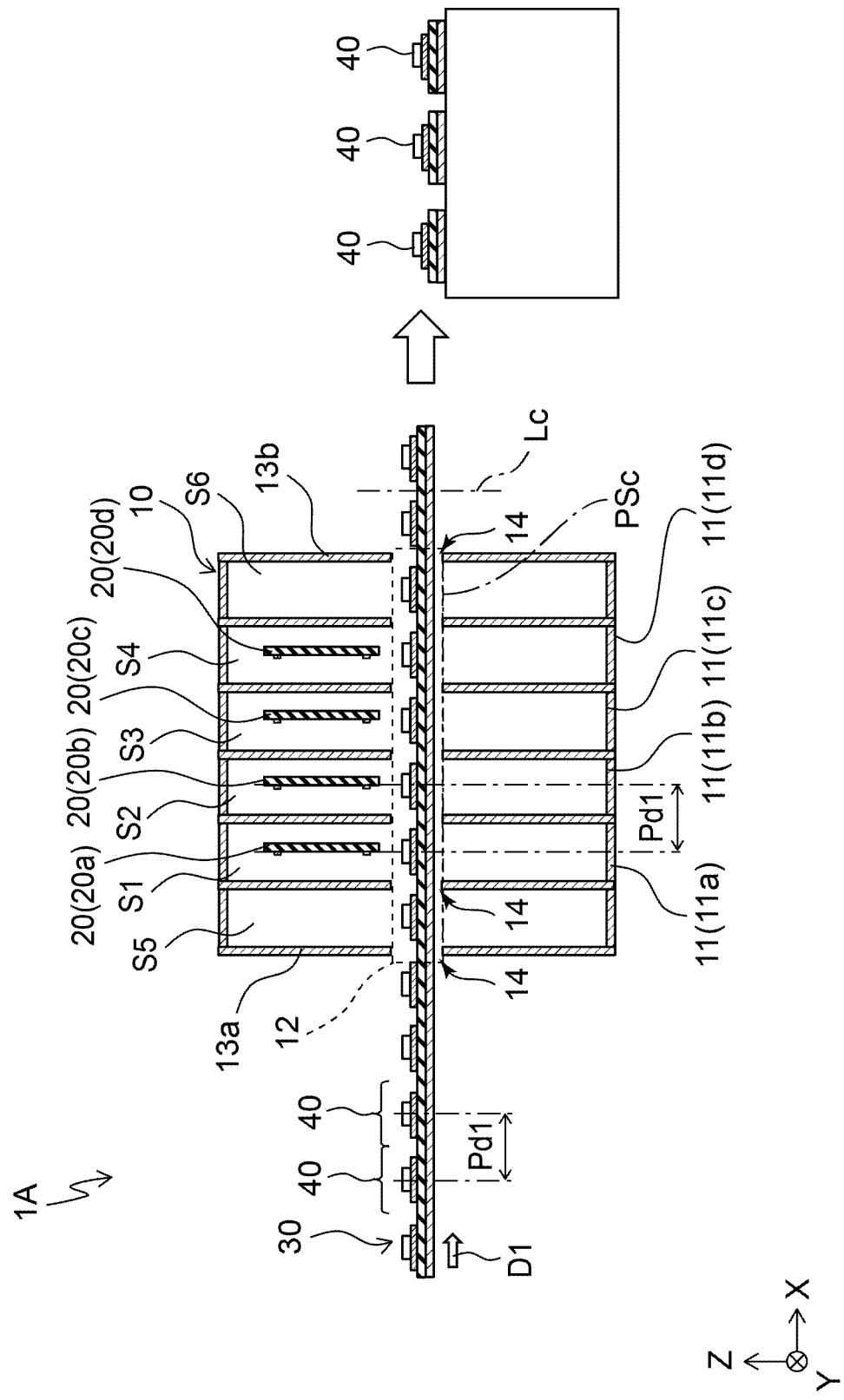

COMMUNICATION APPARATUS AND COMMUNICATION METHOD

CROSS REFERENCE TO RELATED APPLICATIONS

This application is a continuation of PCT Application No. PCT/JP2020/033991, filed Sep. 8, 2020, which claims priority to Japanese Patent Application No. 2019-232941, filed Dec. 24, 2019, the entire contents of each of which are hereby incorporated in their entirety.

TECHNICAL FIELD

The present invention relates to a communication apparatus and a communication method for communicating with wireless communication devices used for short-range wireless communication devices, such as radio frequency identification (RFID) tags.

BACKGROUND

Currently, communication methods for wireless communication device are known, such as a method of inspecting whether an IC inlet to be inspected is good or defective with a multiplicity of IC inlets being formed on an insulation film, as described in JP-A-2004-220141 (hereinafter "Patent Document 1"), for example.

In particular, Patent Document 1 discloses an inspection method using an inlay sheet on which a plurality of IC inlets are arrayed. In the method of Patent Document 1, microwaves are irradiated on only a single IC inlet to be inspected of the plurality of IC inlets using a radio wave absorbing plate, to thereby inspect the IC inlet.

In the method of Patent Document 1, however, there still remains room for improvement in terms of efficient communication with wireless communication devices.

SUMMARY OF THE INVENTION

Accordingly, it is an object of the present invention to provide a communication apparatus and a communication method that achieves efficient communication with wireless communication devices.

In particular, a communication apparatus of an exemplary aspect is provided for communicating with wireless communication devices. The exemplary communication apparatus includes a shield device defining a plurality of shield spaces arranged along a transport path transporting a sheet on which a plurality of wireless communication devices are arrayed; and a plurality of reader/writer antennas arranged in each of the plurality of shield spaces. Moreover, the plurality of shield spaces are juxtaposed corresponding to an array pitch between the wireless communication devices on the sheet, a part of the shield device is arranged between the plurality of reader/writer antennas, and the plurality of reader/writer antennas are arranged at a side facing a transport surface of the transport path.

In another exemplary aspect, a communication method is provided for communicating with wireless communication devices. In this aspect, the communication method includes transporting a sheet on which a plurality of wireless communication devices are arrayed into a shield device defining a plurality of shield spaces juxtaposed corresponding to an array pitch between the wireless communication devices; and communicating with the wireless communication device arranged in each of the plurality of shield spaces among the plurality of wireless communication devices on the sheet, by a plurality of reader/writer antennas arranged in each of the plurality of shield spaces. Moreover, a part of the shield device is arranged between the plurality of reader/writer antennas and the plurality of reader/writer antennas are arranged at a side facing a transport surface of the transport path transporting the sheet.

According to the exemplary aspects of the present invention, a communication apparatus and a communication method are provided for wireless communication devices that achieves efficient communication with wireless communication devices.

BRIEF DESCRIPTION OF DRAWINGS

FIG. 11 is an exemplary flowchart of a communication method for the wireless communication device of the first exemplary embodiment.

FIG. 15 is a diagram showing an example of a manufacturing process of the wireless communication device.

DETAILED DESCRIPTION

Figure 1:
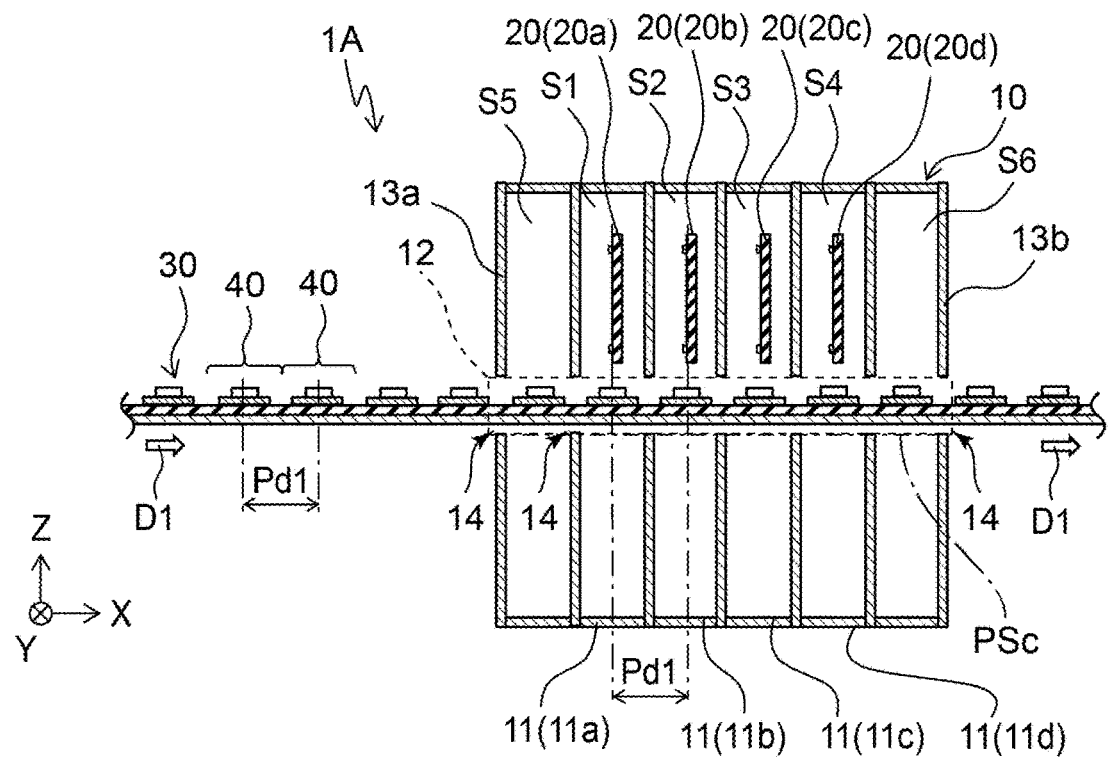
FIG. 1 is a schematic longitudinal section view of a communication apparatus of a first exemplary embodiment.

There have been known a communication apparatus and a communication method for communicating with a wireless communication device in order to perform inspections of the wireless communication device and/or writing of information to the wireless communication device.

As described above, Patent Document 1 discloses a method of communicating with an IC inlet to inspect the IC inlet by irradiating microwaves on a plurality of IC inlets formed on the insulation film. In the method of the Patent Document 1, the radio wave absorbing plate is inserted between the insulation film and an antenna so that, through a slit disposed in the radio wave absorbing plate, microwaves are irradiated on only a single IC inlet to be inspected to thereby prevent neighboring IC inlets from being irradiated with microwaves. Thus, in the method of Patent Document 1, a plurality of IC inlets formed on the insulation film are communicated and inspected in turn one by one.

However, in the method of Patent Document 1, since the plurality of IC inlets are communicated in turn one by one, room for improvement still remains in terms of efficient communication with the IC inlets. In the method of Patent Document 1, even if radio waves (e.g., microwaves) from the antenna are irradiated on only the IC inlet to be inspected through the slit of the radio wave absorbing plate, reflected waves from the IC inlet to be inspected may reach adjacent IC inlets. This makes it difficult for the method of Patent Document 1 to accurately and speedily communicate with a plurality of IC inlets for inspections and writing of information.

To prevent radio waves from reaching IC inlets adjacent to the IC inlet to be inspected in the method of Patent Document 1, it is conceivable to increase the distance between the adjacent IC inlets. However, increase in the distance between the adjacent IC inlets results in increased margins of the inlay sheet, whereupon portions to be discarded increase when the IC inlets are separated into individual pieces.

To achieve efficient communication with wireless communication devices in the method of Patent Document 1, it is conceivable to communicate simultaneously with a plurality of IC inlets using a plurality of antennas and a plurality of radio wave absorbing plates. In this case, to prevent radio waves from the adjacent antennas and reflected waves from the adjacent IC inlets from reaching the IC inlet to be inspected, it is required to increase the distance between the IC inlets, the distance between the antennas, and the distance between the radio wave absorbing plates. This brings about increase in size of the apparatus when communicating simultaneously with the plurality of IC inlets for inspections in Patent Document 1.

In view of these limitations of the method disclosed in Patent Document 1, the inventors determined that a reader/writer antenna is arranged in each of a plurality of shield spaces to communicate with a wireless communication device transported into each of the plurality of shield spaces.

Accordingly, a communication apparatus is provided for an exemplary aspect for communicating wireless communication devices. In this aspect, the communication apparatus comprises a shield device defining a plurality of shield spaces arranged along a transport path transporting a sheet on which a plurality of wireless communication devices are arrayed; and a plurality of reader/writer antennas arranged in each of the plurality of shield spaces. Moreover, the plurality of shield spaces are juxtaposed corresponding to an array pitch between the wireless communication devices on the sheet, a part of the shield device is arranged between the plurality of reader/writer antennas, and the plurality of reader/writer antennas are arranged at a side facing a transport surface of the transport path.

Such a configuration achieves efficient communication with the wireless communication devices because the reader/writer antenna and the wireless communication device can communicate with each other in each of the plurality of shield spaces.

In the communication apparatus, the plurality of reader/writer antennas can include a loop antenna having a loop surface in a direction intersecting a transport surface of the transport path on which the sheet is arranged.

Such a configuration enables the loop antenna to radiate an electric field toward the wireless communication device having an electric field radiation type antenna to communicate with the wireless communication device within the shield space. As a result, the communication apparatus is configured to perform a communication range check in addition to operation check of the wireless communication device as the inspections of the wireless communication device.

In the communication apparatus, the wireless communication device can comprise an RFIC element; a matching inductor connected to the RFIC element; and a dipole antenna connected to the matching inductor.

Such a configuration ensures efficient communication with the plurality of wireless communication devices each having the dipole antenna arrayed on the inlay sheet.

In the communication apparatus, the wireless communication device can comprise a dielectric member; an RFIC element disposed on a front surface of the dielectric member and including a first terminal electrode and a second terminal electrode; a first radiation electrode disposed on the front surface of the dielectric member and connected to the first terminal electrode of the RFIC element; a second radiation electrode disposed on the front surface of the dielectric member and connected to the second terminal electrode of the RFIC element independently of the first radiation electrode; and a back-surface electrode disposed on a back surface of the dielectric member and connected to the second radiation electrode via an interlayer connecting conductor. Moreover, the RFIC element can be connected to a matching inductor, and the first radiation electrode and the second radiation electrode can be connected to the matching inductor.

Such a configuration ensures efficient communication with the plurality of wireless communication devices arrayed on the inlay sheet, the wireless communication devices each including the first radiation electrode and the second radiation electrode disposed on the principal surface of the dielectric member and the back-surface electrode disposed on the back surface of the dielectric member.

In the communication apparatus, the shield device can comprise a plurality of boxes having a plurality of side walls defining the plurality of shield spaces, the plurality of side walls of the plurality of boxes may each include a slit, and the slit may form part of the transport path.

Such a configuration suppresses leakage of radio waves into the adjacent shield spaces and suppress the entry of noise from the outside of the communication device and/or leakage of radio waves generated from the reader/writer antenna, making it possible to improve the shielding properties of the shield device.

In the communication apparatus, the shield device can comprise a noise blocking member blocking noise at an entrance and an exit of the transport path.

Such a configuration further suppresses entry of external noise and further improve the shielding properties of the shield device.

In the communication apparatus, adjacent ones of the wireless communication devices can share with each other an outer shape line defining contours of the wireless communication devices on the sheet.

In the communication apparatus, the shield device can also comprise a plurality of boxes having a plurality of side walls defining the plurality of shield spaces, the loop antenna can comprise a substrate; and a loop antenna pattern arranged in a loop shape on the substrate, the loop antenna pattern can include antenna patterns confronting each other in a direction intersecting the transport surface of the transport path, and a length between the confronting antenna patterns can be smaller than a length between the loop surface and the plurality of side walls of the plurality of boxes in a thickness direction of the substrate.

Such a configuration suppresses a magnetic field generated from the loop surface from reaching the plurality of side walls, to further improve the shielding properties of the shield device.

In the communication apparatus, the loop surface can be arranged slantingly with respect to the transport surface of the transport path.

Such a configuration allows communication irrespective of the array direction of the plurality of wireless communication devices arrayed on the sheet.

In the communication apparatus, the plurality of reader/writer antennas may have a longitudinal direction.

Such a configuration ensures easy communication with the wireless communication devices.

In the communication apparatus, the plurality of reader/writer antennas can have a longitudinal direction.

In the communication apparatus, the shield device can comprise a frame-shaped main body on which one of the plurality of reader/writer antennas is arranged; and a plurality of frame-shaped spacers arranged adjacent to the main body.

Such a configuration more easily improves the shielding properties of the shield device.

A communication method of an exemplary aspect for communicating wireless communication devices, comprises transporting a sheet on which a plurality of wireless communication devices are arrayed into a shield device defining a plurality of shield spaces juxtaposed corresponding to an array pitch between the wireless communication devices; and communicating with the wireless communication device arranged in each of the plurality of shield spaces among the plurality of wireless communication devices on the sheet, by a plurality of reader/writer antennas arranged in each of the plurality of shield spaces. Moreover, a part of the shield device is arranged between the plurality of reader/writer antennas, and the plurality of reader/writer antennas are arranged at a side facing a transport surface of the transport path transporting the sheet.

Such a configuration enables the reader/writer antenna disposed in each of the plurality of shield spaces to independently communicate, on a one-to-one basis, with the wireless communication device lying in corresponding one of the shield spaces. This makes it possible to communicate simultaneously with the plurality of wireless communication devices, leading to remarkably shortened communication time.

In the communication method, the communicating may include reading and writing inspection data from and to the wireless communication device by the plurality of reader/writer antennas.

Due to such a configuration, the inspections can be made independently such that the reader/writer antenna disposed in each of the plurality of shield spaces is in one-to-one correspondence with the wireless communication device lying in corresponding one of the shield spaces. This enables simultaneous inspections of the plurality of wireless communication devices, leading to remarkably shortened inspection time.

In the communication method, the communicating can include measuring an RSSI strength of the wireless communication device by the plurality of reader/writer antennas.

Due to such a configuration, the communication range checks can be made independently such that the reader/writer antenna disposed in each of the plurality of shield spaces is in one-to-one correspondence with the wireless communication device lying in corresponding one of the shield spaces. This makes it possible to simultaneously check the communication ranges of the plurality of wireless communication devices, leading to remarkably shortened check time of the communication ranges.

In the communication method, the communicating may include encoding the wireless communication device by the plurality of reader/writer antennas.

Such a configuration achieves efficient encoding of the wireless communication device arranged in each of the plurality of shield spaces.

Exemplary embodiments of the present invention will now be described with reference to the accompanying drawings. In the drawings, each element is exaggerated for each of explanation.

First Exemplary Embodiment

[Configuration of Communication Apparatus]

Figure 2:
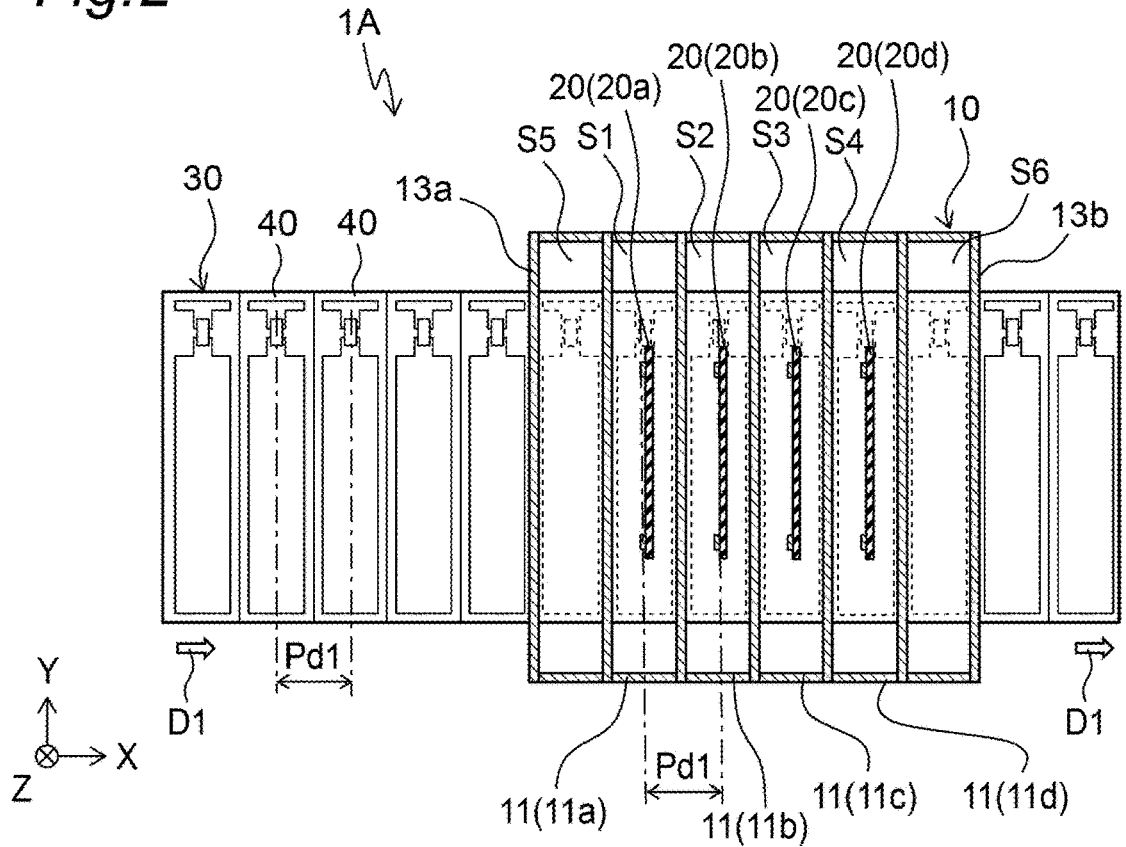
FIG. 2 is a schematic plan section view of the communication apparatus of the first exemplary embodiment.

FIG. 1 is a schematic longitudinal section view of a communication apparatus 1A of a first exemplary embodiment. FIG. 2 is a schematic plan section view of the communication apparatus 1A. To aid the understanding of the exemplary embodiment, the drawings show an X-Y-Z coordinate system having X-axis, Y-axis, and Z-axis that are orthogonal to one another. As used herein, Z-axis direction is a height direction of the communication apparatus 1A, X-axis direction is a width direction, and Y-axis direction is a length direction.

As used herein, "communication apparatus" refers to an apparatus that communicates with a wireless communication device to inspect and/or encode the wireless communication device. Specifically, it is an apparatus that, using a reader/writer antenna, communicates with a plurality of wireless communication devices arrayed on an inlay sheet, to perform inspections of the wireless communication devices and/or writing of information thereinto.

As shown in FIGS. 1 and 2, the communication apparatus 1A includes a shield device 10 and a plurality of reader/writer antennas 20.

<Shield Device>

The shield device 10 is formed from a member defining a plurality of shield spaces S1 to S4 therein. The shield device 10 is formed from a member that can shield radio waves of wireless communication devices 40 and external noise. For example, the shield device 10 is made of a metal material in an exemplary aspect.

In the first embodiment, the shield device 10 is formed from a plurality of boxes 11 defining the plurality of shield spaces S1 to S4 therein. The plurality of boxes 11 include four boxes 11a, 11b, 11c, and 11d of the same shape and the same size. The four boxes 11a, 11b, 11c, and 11d form therein the shield spaces S1, S2, S3, and S4, respectively.

The plurality of boxes 11a, 11b, 11c, and 11d are arranged along a transport path 12 through which an inlay sheet 30 having the wireless communication devices 40 arrayed thereon is transported. In this manner, the shield device 10 defines therein the shield spaces S1 to S4 that are arranged along the transport path 12 through which the inlay sheet 30 having the wireless communication devices 40 arrayed thereon is transported.

As shown, the boxes 11a to 11d each have a top wall, a bottom wall, and a plurality of side walls. The top wall, the bottom wall, and the plurality of side walls are each formed from a rectangular plate. The boxes 11a to 11d define therein the shield spaces S1 to S4, respectively, by enclosing with their respective top surfaces, bottom surfaces, and plurality of side walls. The boxes 11a to 11d have a structure in which their side walls are each arranged between adjacent ones of the shield spaces S1 to S4. That is, in the boxes 11a to 11d, the side walls function as walls partitioning adjacent ones of the shield spaces S1 to S4. In the first embodiment, the boxes 11a to 11d each have the top wall, the bottom wall, and four side walls.

Moreover, the side walls of the boxes 11a to 11d each have a slit 14 that is disposed passing through, in X-axis direction, a central portion of each of the side walls of the boxes 11a to 11d. The slit 14 is formed in a rectangular shape with dimensions that allow the inlay sheet 30 to pass through. The slit 14 is formed in a rectangular shape whose longitudinal direction is Y-axis direction and whose lateral direction is Z-axis direction, when viewed from X-axis direction.

In the first embodiment, the slit 14 forms part of the transport path 12. More specifically, the slit 14 is formed by making a rectangular hole in the side walls of the boxes 11a to 11d partitioning the shield spaces S1 to S4. The boxes 11a to 11d are formed from walls directly connected electrically, except for the transport path 12 through which the inlay sheet 30 is transported. For this reason, the slit 14 is invisible from Y direction and Z direction of FIG. 1.

As shown in FIGS. 1 and 2, the shield spaces S1 to S4 are juxtaposed corresponding to an array pitch Pd1 of the plurality of wireless communication devices 40 arrayed on the inlay sheet 30. Specifically, the shield spaces S1 to S4 are juxtaposed at the same pitch as the array pitch Pd1 of the wireless communication devices 40 arrayed on the inlay sheet 30. For example, the array pitch Pd1 can be determined by the distance between RFIC chips of the adjacent wireless communication devices 40.

The shield spaces S1 to S4 are each formed to store one wireless communication device 40 to be communicated among the plurality of wireless communication devices 40 arrayed on the inlay sheet 30.

At an entrance and an exit of the transport path 12, the shield device 10 includes noise blocking members 13a and 13b that block noise. In the first embodiment, the noise blocking members 13a and 13b are boxes forming shield spaces S5 and S6 therein. Specifically, the noise blocking members 13a and 13b are arranged surrounding the entrance and the exit of the transport path 12. The noise blocking members 13a and 13b block external noise and suppress entering of the external noise into the shield device 10 and/or leakage of radio waves radiated from the reader/writer antennas 20.

Since the shield spaces S1 to S4 within the shield device 10 each form an electromagnetic shield space, frequencies of the plurality of reader/writer antennas 20 described later can freely be set regardless of regulations of country-specific Radio Act, and the like. Especially, when there are boxes for the shield spaces S5 and S6, the effect of suppressing the leakage of radio waves radiated from the reader/writer antennas 20 is increased.

<Reader/Writer Antenna>

The reader/writer antenna 20 is an antenna that communicates with the wireless communication devices 40 to perform inspections and/or information writing. Specifically, by electric field coupling, the reader/writer antenna 20 communicates wirelessly with the wireless communication devices 40 arrayed on the inlay sheet 30.

Figure 3:
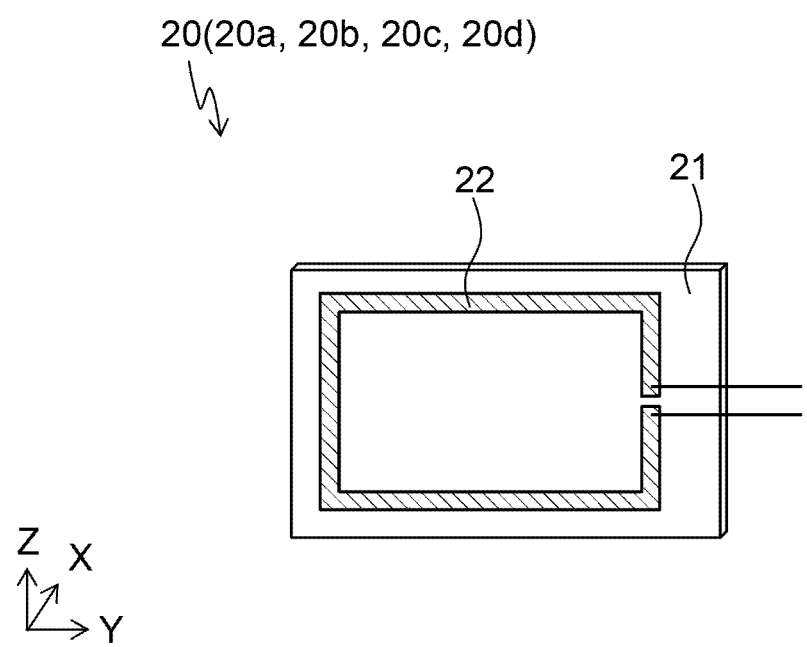
FIG. 3 is a schematic configuration diagram of a reader/writer antenna of the communication apparatus of the first exemplary embodiment.

FIG. 3 is a schematic configuration diagram of the reader/writer antenna 20. As shown in FIG. 3, the reader/writer antenna 20 is a loop antenna. Specifically, the reader/writer antenna 20 includes a plate-shaped substrate 21 and a loop antenna pattern 22 arranged (or otherwise disposed) in a loop shape on the substrate 21. The reader/writer antenna 20 has a loop surface formed on a plate-like surface of the substrate 21 by the loop antenna pattern 22. That is, the loop surface is a surface of the substrate 21 on which the antenna pattern 22 is arranged. This loop antenna radiates an electric field in the loop surface direction (e.g., the Z direction and Y direction of FIG. 3) while radiated with a magnetic field in the direction perpendicular to the loop surface.

The reader/writer antenna 20 is arranged in each of the plurality of shield spaces S1 to S4. In the first embodiment, as shown in FIGS. 1 and 2, four reader/writer antennas 20a, 20b, 20c, and 20d are arranged in the shield spaces S1, S2, S3, and S4, respectively. Specifically, the reader/writer antennas 20a, 20b, 20c and 20d are arranged above the transport path 12 in the shield spaces S1, S2, S3, and S4.

The loop surfaces of the reader/writer antennas 20a to 20d are arranged in a direction intersecting a transport surface PSc of the transport path 12. That is, the loop surfaces of the reader/writer antennas 20a to 20d intersect a transport direction D1 in which the inlay sheet 30 is transported. This configuration allows the reader/writer antennas 20a to 20d to radiate an electric field toward the wireless communication devices 40 transported in the shield spaces S1 to S4. As a result, the reader/writer antennas 20a to 20d can communicate with the wireless communication devices 40 in the shield spaces S1 to S4, respectively.

The reader/writer antennas 20a to 20d can perform inspections such as memory operation check of the wireless communication devices 40 and strength check of received signal strength indication (RSSI) of the wireless communication devices 40. The reader/writer antennas 20a to 20d can also perform encoding processing after the completion of check. For example, in response to a customer's request, information such as management numbers may be written to the memories of the wireless communication devices 40.

When the loop surfaces of the reader/writer antennas 20a to 20d are arranged parallel to the transport direction D1 of the inlay sheet 30, the reader/writer antennas 20 is magnetic field coupled with the wireless communication devices 40 each having a magnetic field radiation type antenna. In this case, it is possible to perform the operation check, inspections, and encoding processing of the wireless communication devices 40 each having the magnetic field radiation type antenna.

Moreover, in the exemplary aspect, adjacent reader/writer antennas 20a to 20d have preferably different frequency bands. For example, the reader/writer antennas 20a and 20c may use a frequency band of channel 1, while the reader/writer antennas 20b and 20d may use a frequency band of channel 2 that differs in frequency band from the channel 1.

<Inlay Sheet>

Figure 4:
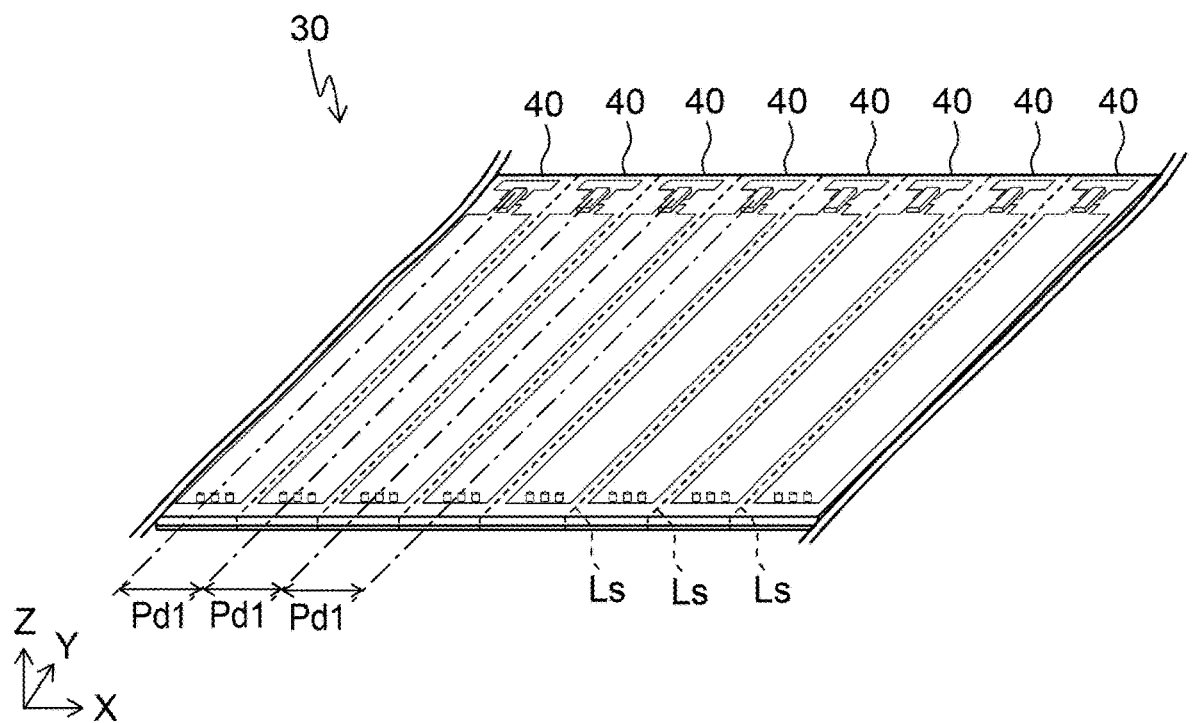
FIG. 4 is a schematic configuration diagram of an inlay sheet.

FIG. 4 is a schematic configuration diagram of the inlay sheet 30. As shown in FIG. 4, the inlay sheet 30 is a sheet having the plurality of wireless communication devices 40 arrayed thereon. In the first embodiment, the plurality of wireless communication devices 40 are aligned with an identical orientation and at an identical array pitch Pd1. In the inlay sheet 30, the plurality of wireless communication devices 40 are densely arrayed in the exemplary aspect.

As used herein, "densely arrayed" indicates that the interval (in the X-axis direction) between adjacent ones of the wireless communication devices 40 is smaller than the width (in the X-axis direction) of each of the wireless communication devices 40. In the first embodiment, the adjacent wireless communication devices 40 are connected to each other without margins on the inlay sheet 30. That is, the adjacent wireless communication devices 40 share an outer shape line Ls defining a contour of each of the wireless communication devices 40.

The outer shape line Ls serves as a cutting line for separating the adjacent wireless communication devices 40 into individual pieces. By cutting the plurality of wireless communication devices 40 arrayed on the inlay sheet 30 along the respective outer shape lines Ls, the adjacent wireless communication devices 40 can be separated and individuated. In the case of sharing the outer shape lines Ls, the adjacent wireless communication devices 40 need not have margins between the adjacent wireless communication devices 40, with the result that no waste occurs when separating the wireless communication devices 40 into individual pieces.

<Wireless Communication Device>

Figure 5A:
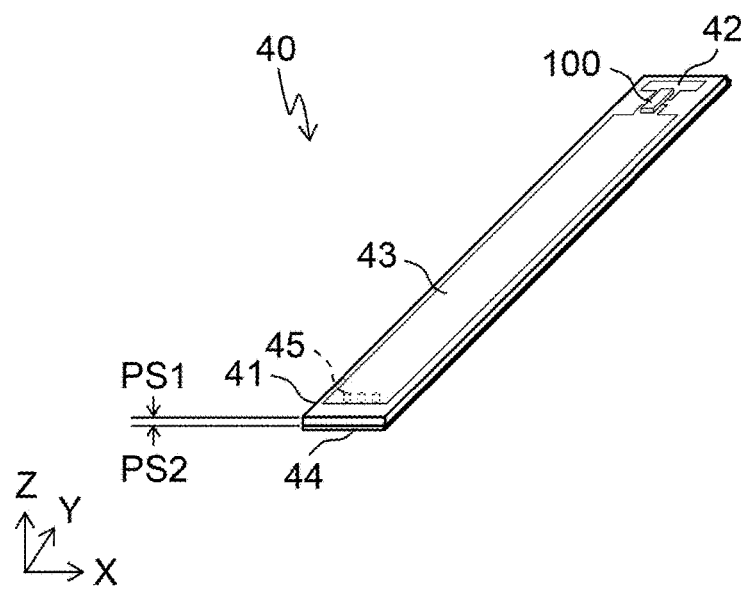
FIG. 5A is a schematic perspective view of an example of a wireless communication device.

The wireless communication device 40 is an RFID tag that makes wireless communication at a carrier frequency in UHF band, e.g., 900 MHz band. FIG. 5A is a schematic perspective view of an example of the wireless communication device 40. As shown in FIG. 5A, the wireless communication device 40 includes a plate-shaped dielectric member (dielectric substrate) 41, and a first radiation electrode 42 and a second radiation electrode 43 that are disposed on a principal surface (front surface) PS1 of the dielectric substrate 41. The wireless communication device 40 includes a radio frequency integrated circuit (RFIC) element 100 disposed on the principal surface PS1 of the dielectric substrate 41. The wireless communication device 40 includes a back-surface electrode 44 disposed on a back surface PS2 facing the principal surface PS1 of the dielectric substrate 41. Moreover, the second radiation electrode 43 and the back-surface electrode 44 are connected to each other via interlayer connecting conductor 45.

Figure 5B:
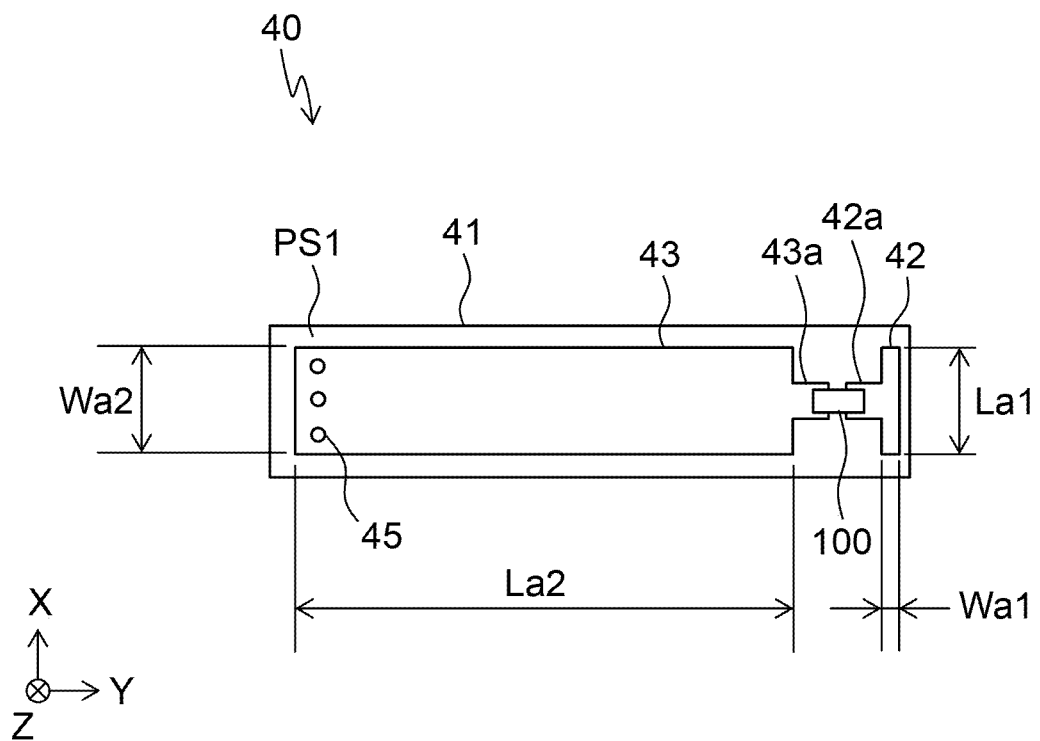
FIG. 5B is a schematic plan view of the example of the wireless communication device.
Figure 5C:
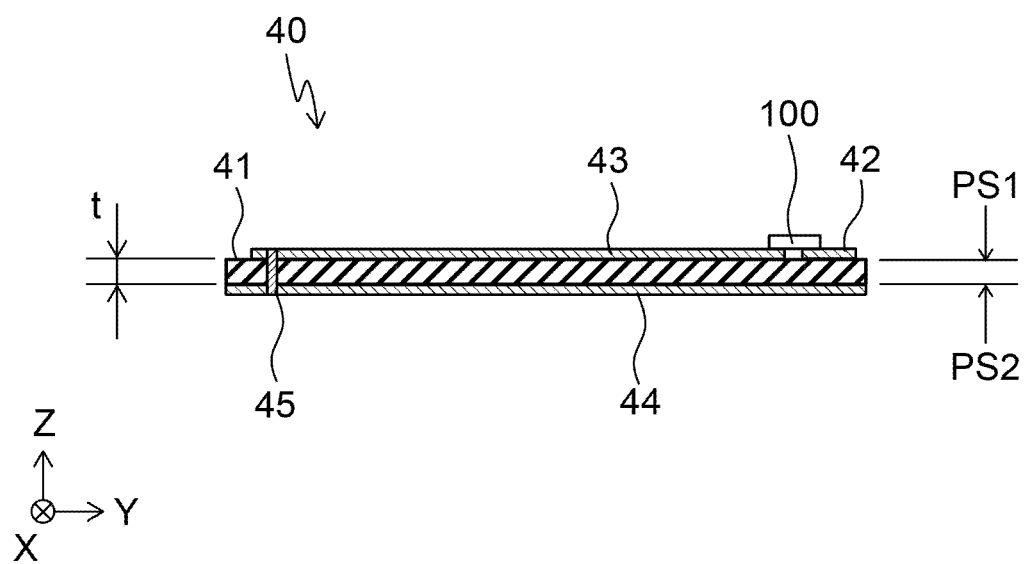
FIG. 5C is a schematic section view of the example of the wireless communication device.

FIG. 5B is a schematic plan view of the example of the wireless communication device 40. FIG. 5C is a schematic section view of the example of the wireless communication device 40. As shown in FIGS. 5A to 5C, the dielectric substrate 41 of the wireless communication device 40 is in the shape of a thin plate that is rectangular in a plan view having a uniform thickness t and including the principal surface PS1 and the back surface PS2 facing parallel to the principal surface PS1. The dielectric substrate 41 is made of a dielectric material with a low dielectric constant (preferably a relative permittivity of 10 or less). The dielectric substrate 41 is made of a flexible dielectric material such as e.g. polyethylene terephthalate (PET), fluororesin, urethane resin, or paper. The dielectric substrate 41 may be made of a magnetic member.

As shown in FIG. 5C, the first radiation electrode 42, the second radiation electrode 43, and the RFIC element 100 are disposed on the principal surface PS1 side of the dielectric substrate 41. On the other hand, the back-surface electrode 44 of a thin plate shape is disposed on the back surface PS2 side. The dielectric substrate 41 like this allows the first radiation electrode 42 and the second radiation electrode 43 to face parallel to the back-surface electrode 44 apart a predetermined distance corresponding to the thickness t of the dielectric substrate 41. That is, the dielectric substrate 41 acts as a bracket for spacing the first radiation electrode 42 and the second radiation electrode 43 apart from the back-surface electrode 44.

In the exemplary aspect, the first radiation electrode 42 and the second radiation electrode 43 are made of a flexible and conductive material such as, for example, copper film or aluminum film. In the case of the first embodiment, the first radiation electrode 42 and the second radiation electrode 43 are of a rectangular shape having the longitudinal direction and the lateral direction.

The first radiation electrode 42 and the second radiation electrode 43 confront each other in the length direction (Y-axis direction) of the wireless communication device 40. Specifically, the second radiation electrode 43 is independent of, i.e. spaced apart a distance from the first radiation electrode 42.

As shown in FIG. 5B, the first radiation electrode 42 has a length La1 and a width Wa1 (La1>Wa1) and extends along the principal surface PS1 in the width direction (X-axis direction) of the wireless communication device 40. On the other hand, the second radiation electrode 43 has a length La2 and a width Wa2 (La2>Wa2) and extends along the principal surface PS1 in the length direction (Y-axis direction) of the wireless communication device 40. That is, on the principal surface PS1, the first radiation electrode 42 and the second radiation electrode 43 extend in the directions intersecting each other, e.g. in the directions differing 90 degrees from each other.

The width Wa1 of the first radiation electrode 42 is smaller than the width Wa2 of the second radiation electrode 43. The length La1 (length in the extending direction) of the first radiation electrode 42 is smaller than the length La2 of the second radiation electrode 43. Hence, the size (size in top view) of the first radiation electrode 42 is smaller than the size of the second radiation electrode 43.

In the case of the first embodiment, the length La1 of the first radiation electrode 42 is substantially equal to the width Wa2 of the second radiation electrode 43. This configuration reduces the size in the width direction (X-axis direction) of the wireless communication device 40.

Furthermore, although detailed later, the first radiation electrode 42 and the second radiation electrode 43 include land parts 42a and 43a, respectively, for connecting to the RFIC element 100. The land parts 42a and 43a are disposed confronting each other between the first radiation electrode 42 and the second radiation electrode 43.

The back-surface electrode 44 disposed on the back surface PS2 side of the dielectric substrate 41 is made of a flexible and conductive material such as e.g. copper film or aluminum film. In the case of the first embodiment, the back-surface electrode 44 is rectangular and disposed over substantially the entire back surface PS2 of the dielectric substrate 41. The back-surface electrode 44 is connected via the interlayer connecting conductor 45 to the second radiation electrode 43. In the case of the first embodiment, the back-surface electrode 44 is connected to the second radiation electrode 43 by forming the interlayer connecting conductor 45 in a through hole disposed in the interior of the dielectric substrate 41.

Figure 6:
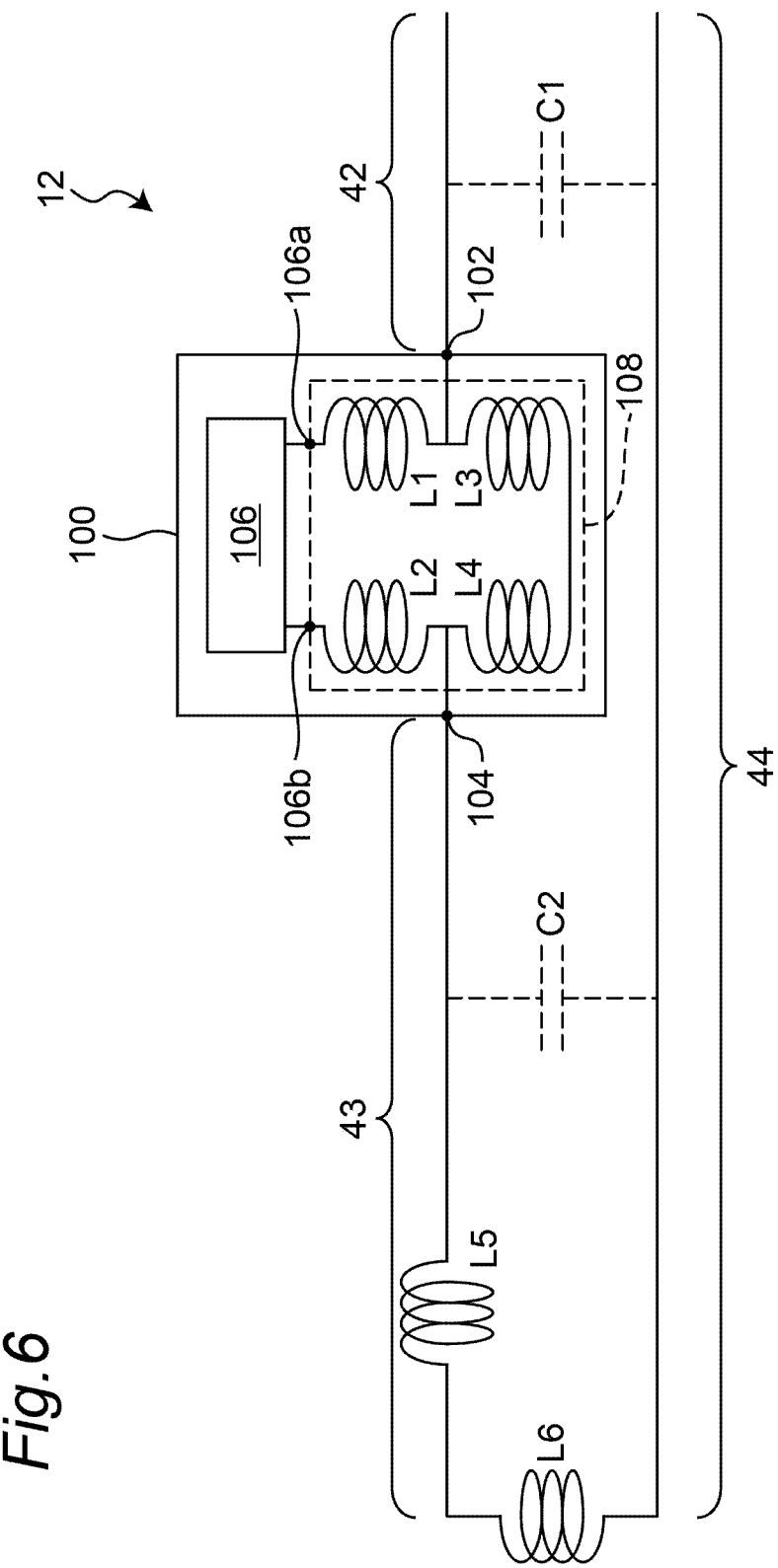
FIG. 6 is a diagram showing an equivalent circuit of the wireless communication device shown in FIG. 5A.

FIG. 6 shows an equivalent circuit of the wireless communication device 40.

As shown in FIG. 6, a stray capacitance C1 is present between the first radiation electrode 42 and part (a portion facing the first radiation electrode 42) of the back-surface electrode 44.

A stray capacitance C2 is present between the second radiation electrode 43 and part (a portion facing the second radiation electrode 43) of the back-surface electrode 44. The stray capacitance C1, a parasitic inductor L5 of the second radiation electrode 43, and a parasitic inductor L6 of the connecting portion between the second radiation electrode 43 and the back-surface electrode 44 form a parallel resonant circuit with a resonant frequency of a predetermined frequency (e.g. 900 MHz).

The stray capacitance C1 between the first radiation electrode 42 and the portion of the back-surface electrode 44 facing the first radiation electrode 42 is made smaller than the stray capacitance C2 between the second radiation electrode 43 and the portion of the back-surface electrode 44 facing the second radiation electrode 43.

Specifically describing, as is apparent from FIG. 5B, the first radiation electrode 42 and the second radiation electrode 43 are independent of (i.e., spaced apart a distance from) each other. Although the first radiation electrode 42 and the second radiation electrode 43 are disposed in the same layer, the area of the portion of the back-surface electrode 44 facing the first radiation electrode 42 is smaller than the area of the portion of the back-surface electrode 44 facing the second radiation electrode 43. As a result, the stray capacitance C1 between the first radiation electrode 42 and the portion of the back-surface electrode 44 facing the first radiation electrode 42 is smaller than the stray capacitance C2 between the second radiation electrode 43 and the portion of the back-surface electrode 44 facing the second radiation electrode 43.

The RFIC element 100 will now be described.

In an exemplary aspect, the RFIC element 100 shown in FIG. 6 is, for example, an RFIC element for communicating at the communication frequency of 900 MHz band, i.e., UHF band. Although detailed later, the RFIC element 100 has flexibility. Furthermore, the RFIC element 100 includes an RFIC chip 106, and a matching circuit 108 for impedance matching between the RFIC chip 106 and the first radiation electrode 42 and the second radiation electrode 43.

The RFIC chip 106 includes a first input/output terminal 106a and a second input/output terminal 106b. The first input/output terminal 106a is connected via the matching circuit 108 to the first radiation electrode 42. The second input/output terminal 106b is connected via the matching circuit 108 to the second radiation electrode 43.

When the first radiation electrode 42 and the second radiation electrode 43 functioning as antennas receive external high-frequency signals, the RFIC chip 106 is activated by being supplied with current induced by the reception. The activated RFIC chip 106 generates high-frequency signals and outputs the generated high-frequency signals as radio waves to the exterior via the first radiation electrode 42 and the second radiation electrode 43.

A specific configuration of the RFIC element 100 will be described.

Figure 7:
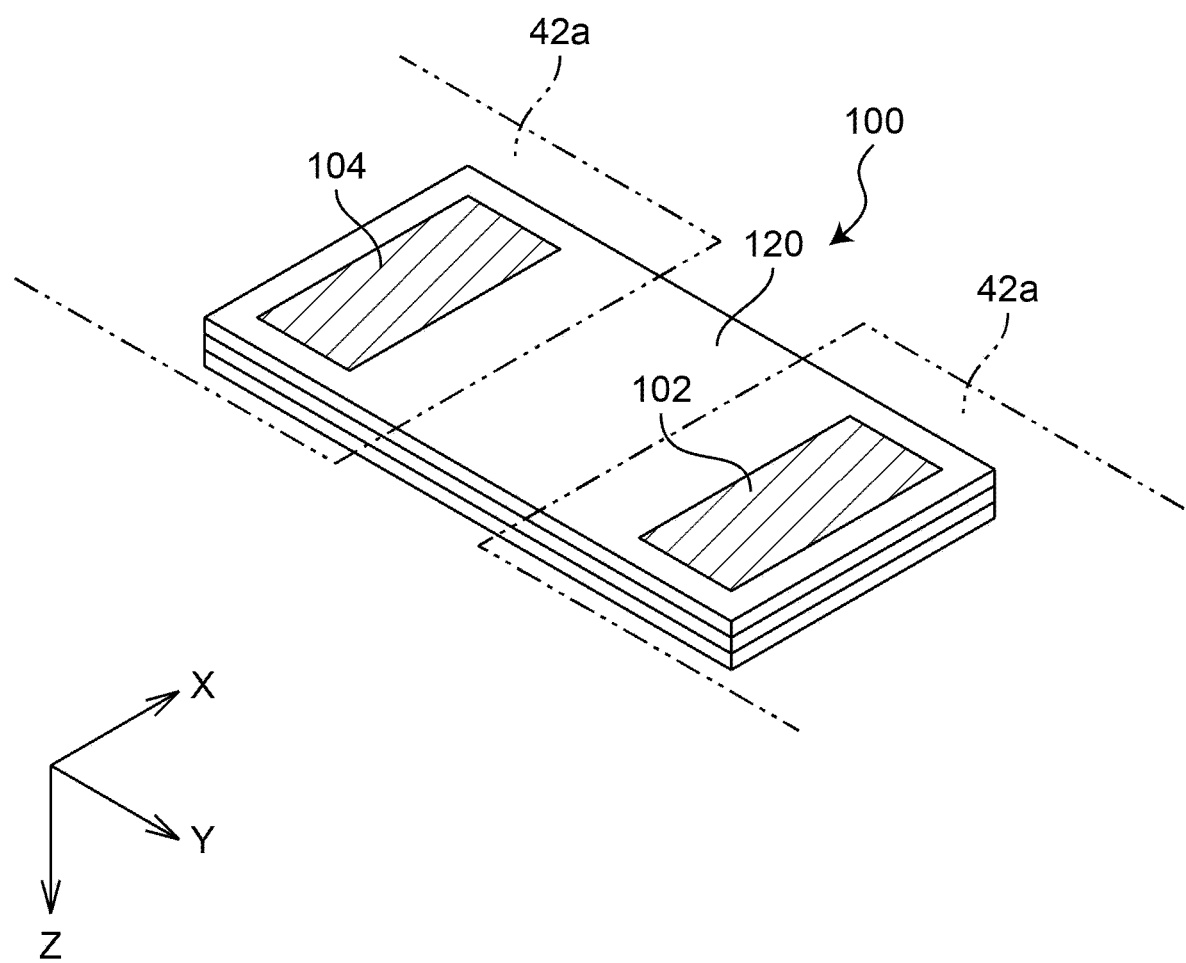
FIG. 7 is a perspective view of an RFIC element.

FIG. 7 is a perspective view of the RFIC element 100. In the case of the first embodiment, the RFIC element 100 includes a multi-layer substrate 120 as an element substrate on which the RFIC chip 106 and the matching circuit 108 are disposed. The multi-layer substrate 120 is configured by laminating a plurality of insulating layers having flexibility. Moreover, the plurality of insulating layers are resin insulating layers having flexibility, such as polyimide, liquid crystal polymer, or the like, for example.

Figure 8:
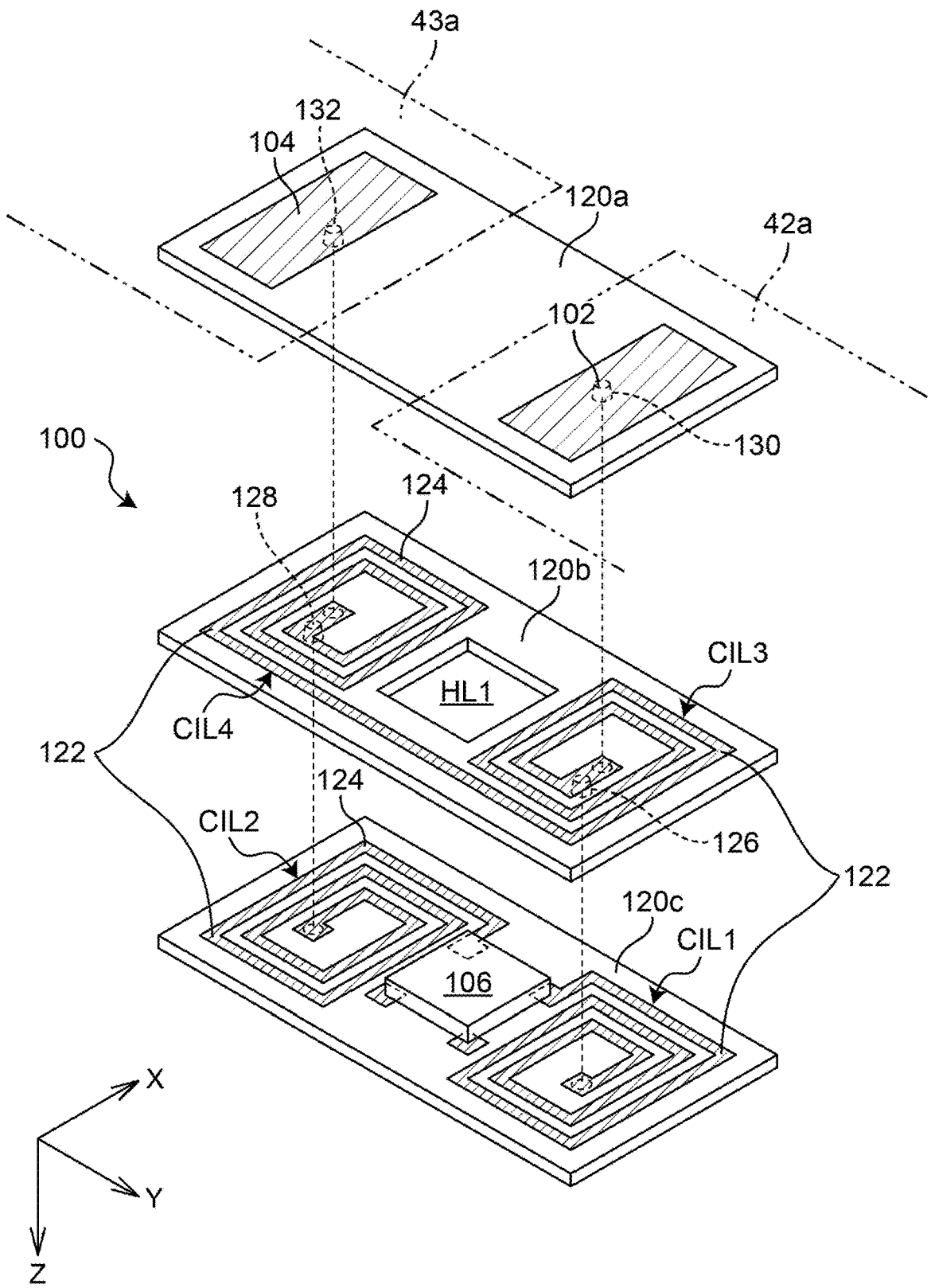
FIG. 8 is a perspective view showing an internal structure of the RFIC element shown in FIG. 7.

FIG. 8 is a perspective view showing an internal structure of the RFIC element shown in FIG. 7. In the following description, the upper side of the RFIC element 100 is the side on which a first terminal electrode 102 and a second terminal electrode 104 are disposed, i.e., the side facing the dielectric substrate 41.

Figure 9A:
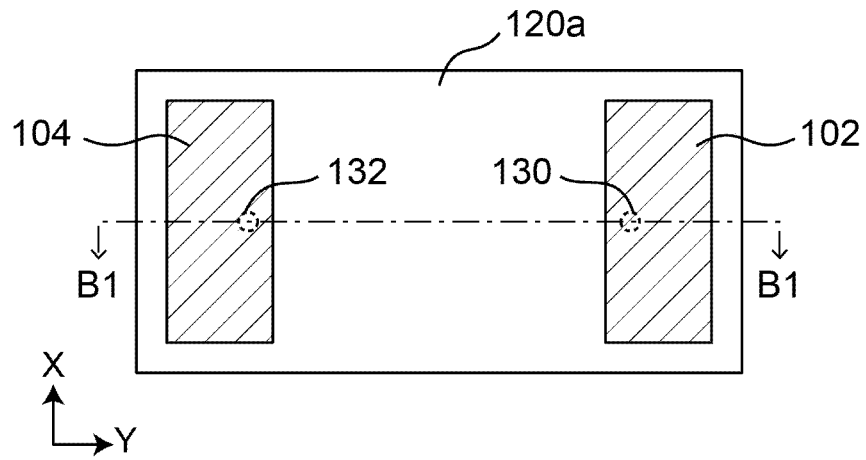
FIG. 9A is a top view of an upper insulating layer of the RFIC element configured as a multi-layer substrate.
Figure 9B:
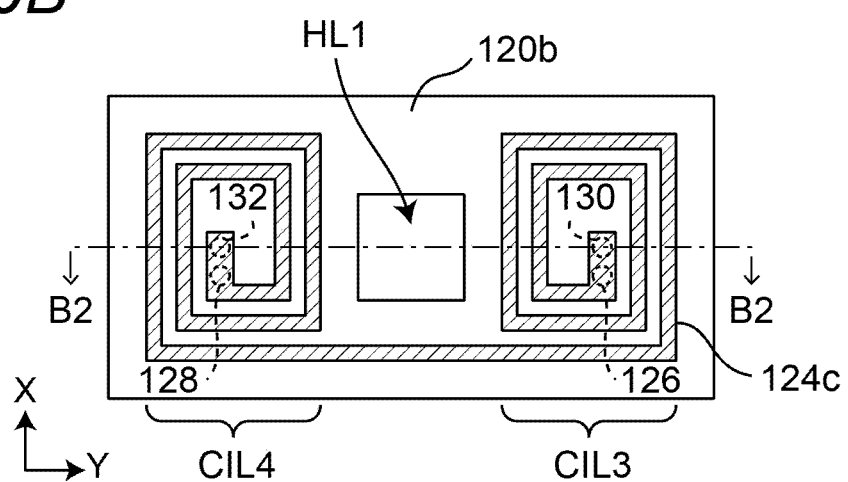
FIG. 9B is a top view of a middle insulating layer of the RFIC element.
Figure 9C:
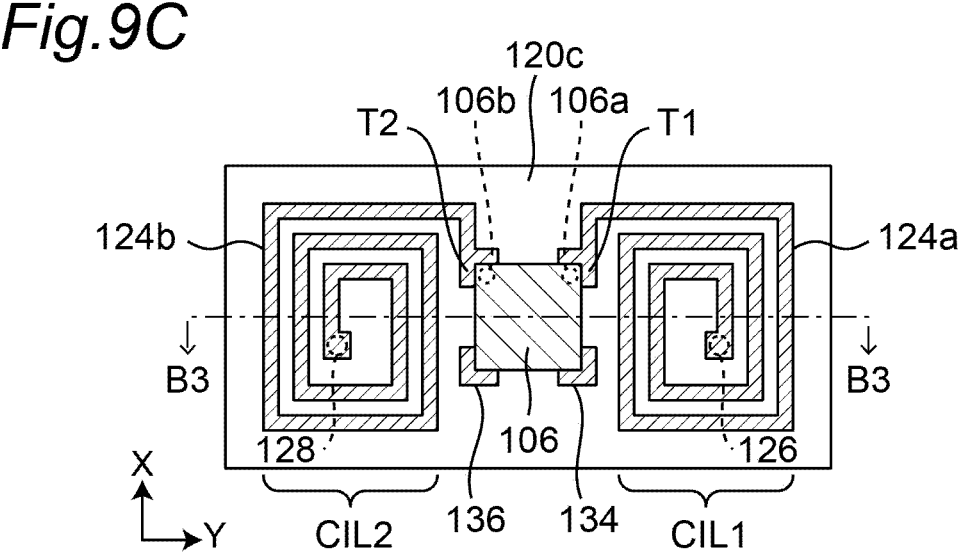
FIG. 9C is a top view of a lower insulating layer of the RFIC element.
Figure 10A:
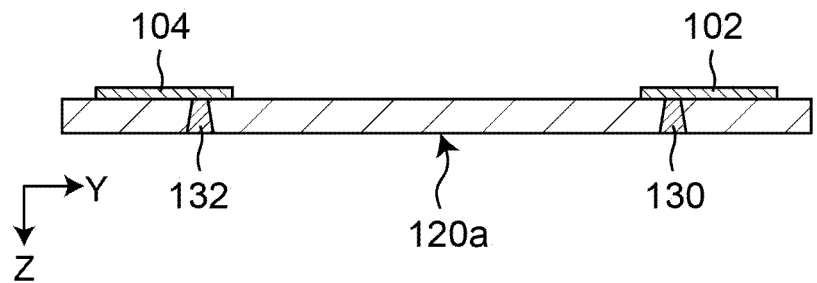
FIG. 10A is a section view of the upper insulating layer taken along line B1-B1 shown in FIG. 9A.
Figure 10B:
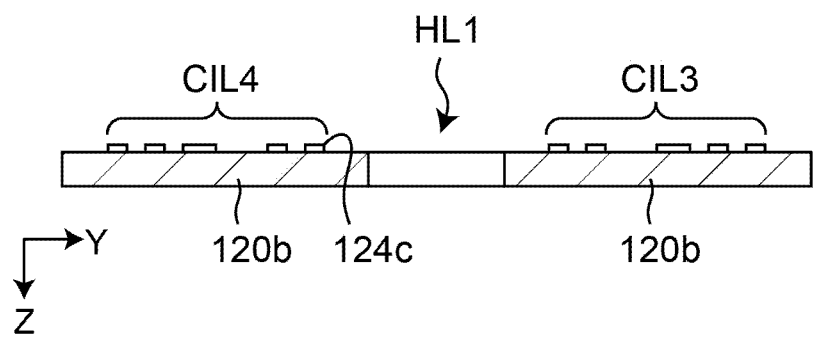
FIG. 10B is a section view of the middle insulating layer taken along line B2-B2 shown in FIG. 9B.
Figure 10C:
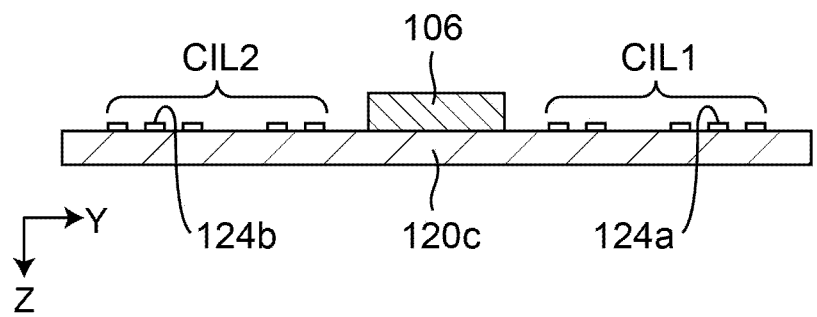
FIG. 10C is a section view of the lower insulating layer taken along line B3-B3 shown in FIG. 9C.

FIG. 9A is a top view of an upper insulating layer of the multi-layer substrate 120. FIG. 9B is a top view of an intermediate layer of the multi-layer substrate 120. FIG. 9C is a top view of a lower insulating layer of the multi-layer substrate 120. FIG. 10A is a section view of the insulating layer taken along line B1-B1 shown in FIG. 9A. FIG. 10B is a section view of the insulating layer taken along line B2-B2 shown in FIG. 9B. FIG. 10C is a section view of the insulating layer taken along line B3-B3 shown in FIG. 9C.

As shown in FIG. 8, the multi-layer substrate 120 includes internally the RFIC chip 106 and a power supply circuit 122 acting as the matching circuit 108. The multi-layer substrate 120 is formed with the first terminal electrode 102 and the second terminal electrode 104.

The RFIC chip 106 has a structure in which various elements are built in a semiconductor substrate made of a semiconductor material such as silicon. As shown in FIG. 9C, the RFIC chip 106 is formed with the first input/output terminal 106a and the second input/output terminal 106b.

As shown in FIG. 8, the power supply circuit 122 is composed of a coil conductor 124 and interlayer connecting conductors 126 and 128. The coil conductor 124 is composed of coil patterns 124a to 124c shown in FIG. 9B or 9C. In this aspect, the coil pattern 124a forms a first coil part CIL1 and the coil pattern 124b forms a second coil part CIL2. Moreover, the coil pattern 124c forms a third coil part CIL3 and a fourth coil part CIL4.

The first coil part CIL1, the third coil part CIL3, and the interlayer connecting conductor 126 are arranged so as to align in the thickness direction (Z-axis direction) at a position on one side in the length direction (Y-axis direction). The second coil part CIL2, the fourth coil part CIL4, and the interlayer connecting conductor 128 are arranged so as to align in the thickness direction (Z-axis direction) at a position on the other side in the length direction (Y-axis direction).

The RFIC chip 106 is interposed between the first coil part CIL1 and the second coil part CIL2 when viewing the multi-layer substrate 120 in the height direction (Z-axis direction). The RFIC chip 106 is interposed also between the third coil part CIL3 and the fourth coil part CIL4.

The first terminal electrode 102 is arranged at a position on one side in the length direction (Y-axis direction), while the second terminal electrode 104 is arranged at a position on the other side. The first terminal electrode 102 and the second terminal electrode 104 are made of copper foil having flexibility and are shaped in strips of the same size.

As shown in FIGS. 9A to 9C, the multi-layer substrate 120 is composed of three laminated sheet-like insulating layers 120a to 120c. In this configuration, the insulating layer 120b lies between the upper insulating layer 120a and the lower insulating layer 120c.

The first terminal electrode 102 and the second terminal electrode 104 are formed on the insulating layer 120a.

At the center of the insulating layer 120b, a through hole HL1 having a rectangular section is provided. The through hole HL1 is formed to a size accommodating the RFIC chip 106. The belt-shaped coil pattern 124c is formed on the insulating layer 120b around the through hole HL1. The coil pattern 124c is made of copper foil material having flexibility.

An end on one hand of the coil pattern 124c overlaps with the first terminal electrode 102 when viewed in the thickness direction view (Z-axis direction) and is connected to the first terminal electrode 102 by an interlayer connecting conductor 130 extending in the thickness direction (Z-axis direction). An end on the other of the coil pattern 124c overlaps with the second terminal electrode 104 when viewed in the thickness direction and is connected to the second terminal electrode 104 by an interlayer connecting conductor 132 extending in the thickness direction. The interlayer connecting conductors 130 and 132 are made of a metal bulk containing Sn as a main component.

The coil pattern 124c makes two turns around the end on one hand counterclockwise and then bends to extend in the length direction (Y-axis direction). The coil pattern 124c extended in the length direction (Y-axis direction) bends in the width direction (X-axis direction) and makes two turns around the end on the other counterclockwise to reach the end on the other.

The belt-shaped coil patterns 124a and 124b are formed on the insulating layer 120c. The coil patterns 124a and 124b are made of copper foil material having flexibility.

An outside end (e.g., a first coil end T1) of the coil pattern 124a lies at a position overlapping with one corner of the rectangular through hole HL1. An outside end (e.g., a second coil end T2) of the coil pattern 124b lies at a position overlapping with a corner adjacent in the length direction (Y-axis direction) to the one corner at which the first coil end T1 is located, of four corners of the rectangular through hole HL1.

From a central end of the coil pattern 124a, the coil pattern 124a makes 2.5 turns around the central end clockwise and then bends in the width direction (X-axis direction) to reach the other end (e.g., the first coil end T1). In the same manner, from a central end of the coil pattern 124b, the coil pattern 124b makes 2.5 turns around the central end counterclockwise and then bends in the width direction (X-axis direction) to reach the other end (e.g., the second coil end T2). The central end of the coil pattern 124a is connected to the end on one hand of the coil pattern 124c by the interlayer connecting conductor 126 extending in the thickness direction. The central end of the coil pattern 124b is connected to the end on the other of the coil pattern 124c by the interlayer connecting conductor 128 extending in the thickness direction. The interlayer connecting conductors 126 and 128 are made of a metal bulk containing Sn as a main component.

Here, the position of the central end of the coil pattern 124a or the end on one hand of the coil pattern 124c is referred to as "first position P1", and the position of the central end of the coil pattern 124b or the end on the other of the coil pattern 124c is defined as "second position P2".

The insulating layer 120c is formed with dummy conductors 134 and 136. The dummy conductors 134 and 136 are made of a copper foil material having flexibility. When viewing the insulating layers 120b and 120c in the thickness direction (Z-axis direction), the dummy conductors 134 and 136 are arranged overlapping with corners respectively confronting in the width direction (X-axis direction) the corners at which the first coil end T1 and the second coil end T2 are located, of the four corners of the rectangular through hole HL1.

The RFIC chip 106 is mounted on the insulating layer 120c such that the four corners of the RFIC chip 106 confront the first coil end T1, the second coil end T2, and the dummy conductors 134 and 136, respectively. The first input/output terminal 106a is connected to the first coil end T1, and the second input/output terminal 106b is connected to the second coil end T2.

The insulating layers 120a to 120c have a thickness of 10 μm or more and 100 μm or less. For this reason, the RFIC chip 106 and the power supply circuit 122 built in the multi-layer substrate 120 can be seen through from the outside. Accordingly, the connection status (i.e., the presence or absence of disconnection) between the RFIC chip 106 and the power supply circuit 122 can easily be confirmed.

In the RFIC element 100 shown in the equivalent circuit of FIG. 6, the inductor L1 corresponds to the first coil part CIL1. The inductor L2 corresponds to the second coil part CIL2. The inductor L3 corresponds to the third coil part CIL3. The inductor L4 corresponds to the fourth coil part CIL4. The characteristics of the impedance matching provided by the power supply circuit 122 are defined by the values of the inductors L1 to L4.

A first end of the inductor L1 is connected to the first input/output terminal 106a of the RFIC chip 106. A first end of the inductor L2 is connected to the second input/output terminal 106b of the RFIC chip 106. A second end of the inductor L1 is connected to a one end of the inductor L3. A second end of the inductor L2 is connected to a one end of the inductor L4. A second end of the inductor L3 is connected to an other end of the inductor L4. The first terminal electrode 102 is connected to a connection point between the inductors L1 and L3. The second terminal electrode 104 is connected to a connection point between the inductors L2 and L4.

As can be seen from the equivalent circuit shown in FIG. 6, the first coil part CIL1, the second coil part CIL2, the third coil part CIL3, and the fourth coil part CIL4 are wound so that their magnetic fields are in phase and connected in series to each other. Therefore, the magnetic fields generated by these coil parts CIL1 to CIL4 are oriented in the same direction.

As can be seen from FIGS. 9B and 9C, the first coil part CIL1 and the third coil part CIL3 have substantially the same loop shape and a common first winding axis. Similarly, the second coil part CIL2 and the fourth coil part CIL4 have substantially the same second and a common second winding axis. The first winding axis and the second winding axis are arranged at positions sandwiching the RFIC chip 106.

That is, the first coil part CIL1 and the third coil part CIL3 are magnetically and capacitively coupled. Similarly, the second coil part CIL2 and the fourth coil part CIL4 are magnetically and capacitively coupled.

The RFIC chip 106 is composed of a semiconductor substrate. For that reason, the RFIC chip 106 serves as ground or shield for the first coil part CIL1, the second coil part CIL2, the third coil part CIL3, and the fourth coil part CIL4. As a result, it becomes difficult for the first coil part CIL1 and the second coil part CIL2 or for the third coil part CIL3 and the fourth coil part CIL4 to couple to each other magnetically and capacitively. This can alleviate the concern that the pass band of the communication signals may narrow.

By virtue of such a configuration, the wireless communication device 40 is communicable even if attached to the metal surface of an article, and can have higher communication capability, i.e. can radiate radio waves with higher radiation efficiency.

[Communication Method]

A communication method using the communication apparatus 1A will be described. As used herein, "communication method" refers to a method of communicating with a wireless communication device to inspect and/or encode the wireless communication device. Specifically, it is a method of communicating with a plurality of wireless communication devices arrayed on the inlay sheet using the reader/writer antennas, to perform inspections of the wireless communication devices and/or writing of information thereinto.

FIG. 11 shows an example of a flowchart of a communication method of the first exemplary embodiment. As shown in FIG. 11, at step ST10, the inlay sheet 30 having the plurality of wireless communication devices 40 arrayed thereon is transported into the plurality of shield spaces S1 to S4. Specifically, the inlay sheet 30 is transported onto the transport path 12 of the shield device 10 to arrange the wireless communication devices 40 to be communicated in the plurality of shield spaces S1 to S4 within the interior of the shield device 10.

As described above, the shield spaces S1 to S4 are juxtaposed at a pitch equal to the array pitch Pd1 of the wireless communication devices 40 on the inlay sheet 30. This configuration allows one wireless communication device 40 to be arranged in each of the shield spaces S1 to S4. In the first embodiment, four wireless communication devices 40 are arranged in the shield spaces S1 to S4, respectively.

At step ST20, communication with the plurality of wireless communication devices 40 is made by the reader/writer antennas 20a to 20d arranged in the shield spaces S1 to S4, respectively. Specifically, by radiating electric fields from the reader/writer antennas 20a to 20d in the shield spaces S1 to S4, the reader/writer antennas 20a to 20d can communicate wirelessly with the wireless communication devices 40 arranged in the shield spaces S1 to S4, respectively. In the first embodiment, the reader/writer antennas 20 simultaneously communicate wirelessly with the wireless communication devices 40 arranged in the shield spaces S1 to S4, respectively. Each reader/writer antenna is shielded and signals are attenuated to −40 dB or more (approx. −60 dB or more in the experiment) in the shield spaces. For this reason, signals radiated from each reader/writer antenna do not affect the adjacent reader/writer antenna beyond the shield space. As a result, even though when one reader/writer antenna is receiving reception signals the adjacent reader/writer antenna is sending transmission signals, the one reader/writer antenna can receive the signals without being affected by the signals from the adjacent reader/writer antenna.

Step ST20 includes step ST21 of writing and reading inspect data to and from the wireless communication devices 40 by the reader/writer antennas 20a to 20d. At step ST21, the wireless communication devices 40 are inspected through communication between the reader/writer antennas 20a to 20d and the wireless communication devices 40. Specifically, at step ST21, by the reader/writer antennas 20a to 20d, the memory operation check is performed for the wireless communication devices 40 arranged in the shield spaces S1 to S4.

In the first embodiment, at step ST21, inspection data is written to the memories of the wireless communication devices 40 by the reader/writer antennas 20a to 20d. The data written to the memories of the wireless communication devices 40 is read by the reader/writer antennas 20a to 20d. In this manner, at step ST21, by the reader/writer antennas 20a to 20d, the memory operation check is performed by whether inspection data can be written to and read from the memories of the wireless communication devices 40 by the reader/writer antennas 20a to 20d.

After the memory operation checks, the inspection data written to the memories of the wireless communication devices 40 is deleted by the reader/writer antennas 20a to 20d.

Step ST20 includes step ST22 of measuring the RSSI strength of the wireless communication devices 40 by the reader/writer antennas 20a to 20d. The reading range (e.g., the communication range) of the wireless communication devices 40 can be checked by measuring the RSSI strength by the reader/writer antennas 20a to 20d at step ST22.

Step ST20 includes step ST23 of encoding the wireless communication devices 40 that have been inspected. At step ST23, information such as management numbers is written by the reader/writer antennas 20a to 20d to the memories of the wireless communication devices 40.

After inspecting and encoding the plurality of wireless communication devices 40, the inlay sheet 30 placed on the transport path 12 is transported toward the transport direction D1 to arrange the next wireless communication devices 40 in the shield spaces S1 to S4. Steps ST10 and ST20 are then executed for the next wireless communication devices 40.

In this manner, the communication method of the exemplary embodiment enables simultaneous communication with the plurality of wireless communication devices 40, so that the communication time of the wireless communication devices 40 can be shortened.

[Manufacturing Method for Wireless Communication Device]

Description will be given of a manufacturing method for the wireless communication device using the communication method of the present invention.

Figure 12:
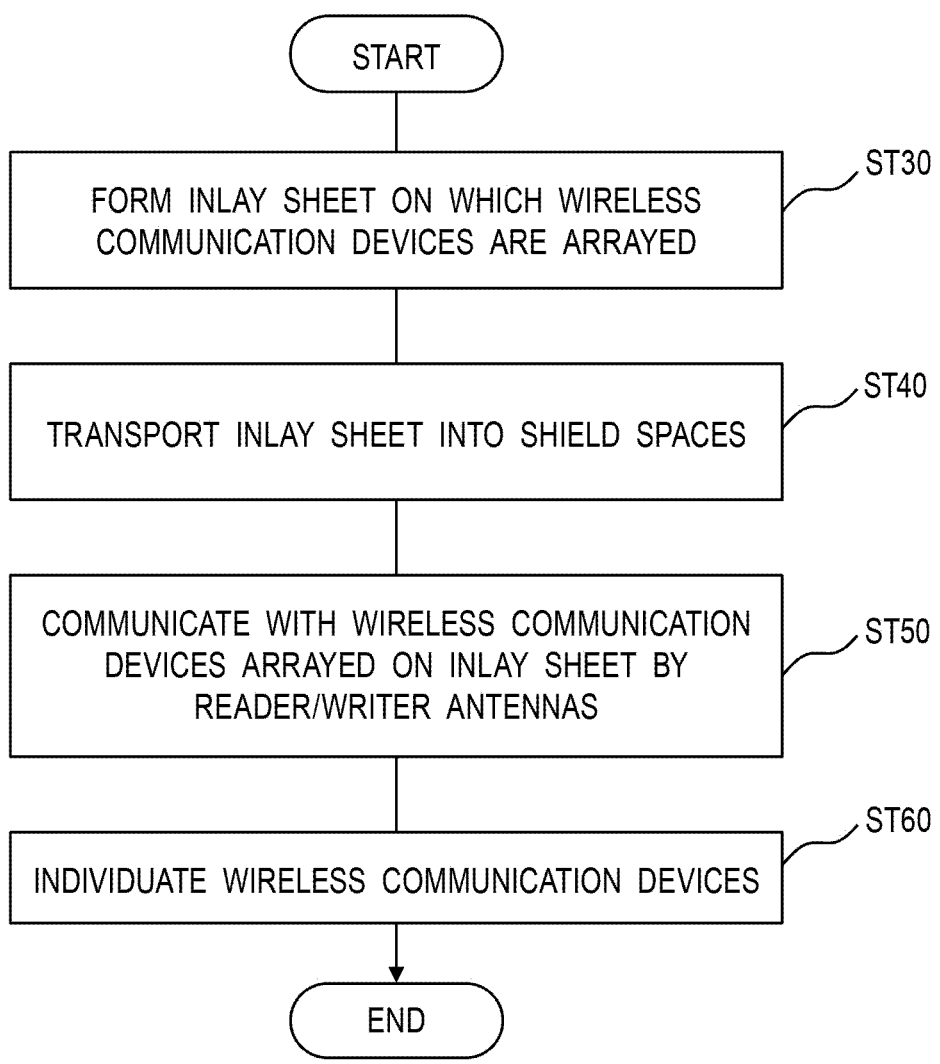
FIG. 12 is an exemplary flowchart of a manufacturing method the wireless communication device.

FIG. 12 shows an exemplary flowchart of the manufacturing method of the wireless communication device 40. As shown in FIG. 12, the manufacturing method of the wireless communication device 40 includes: a step (step ST30) of forming an inlay sheet 30 on which a plurality of wireless communication devices 40 are arrayed; a step (step ST40) of transporting the inlay sheet 30 with the plurality of wireless communication devices 40 arrayed thereon into a plurality of shield spaces S1 to S4 that are juxtaposed corresponding to an array pitch between the wireless communication devices 40; a step (step ST50) of communicating with wireless communication devices 40 arranged in the plurality of shield spaces S1 to S4, respectively, of the plurality of wireless communication devices 40 on the inlay sheet 30, via reader/writer antennas 20a to 20d arranged in the plurality of shield spaces S1 to S4, respectively; and a step (step ST60) of individuating the plurality of wireless communication devices 40 on the inlay sheet 30.

The steps of the manufacturing method of the wireless communication device 40 will hereinafter be described.

Figure 13:
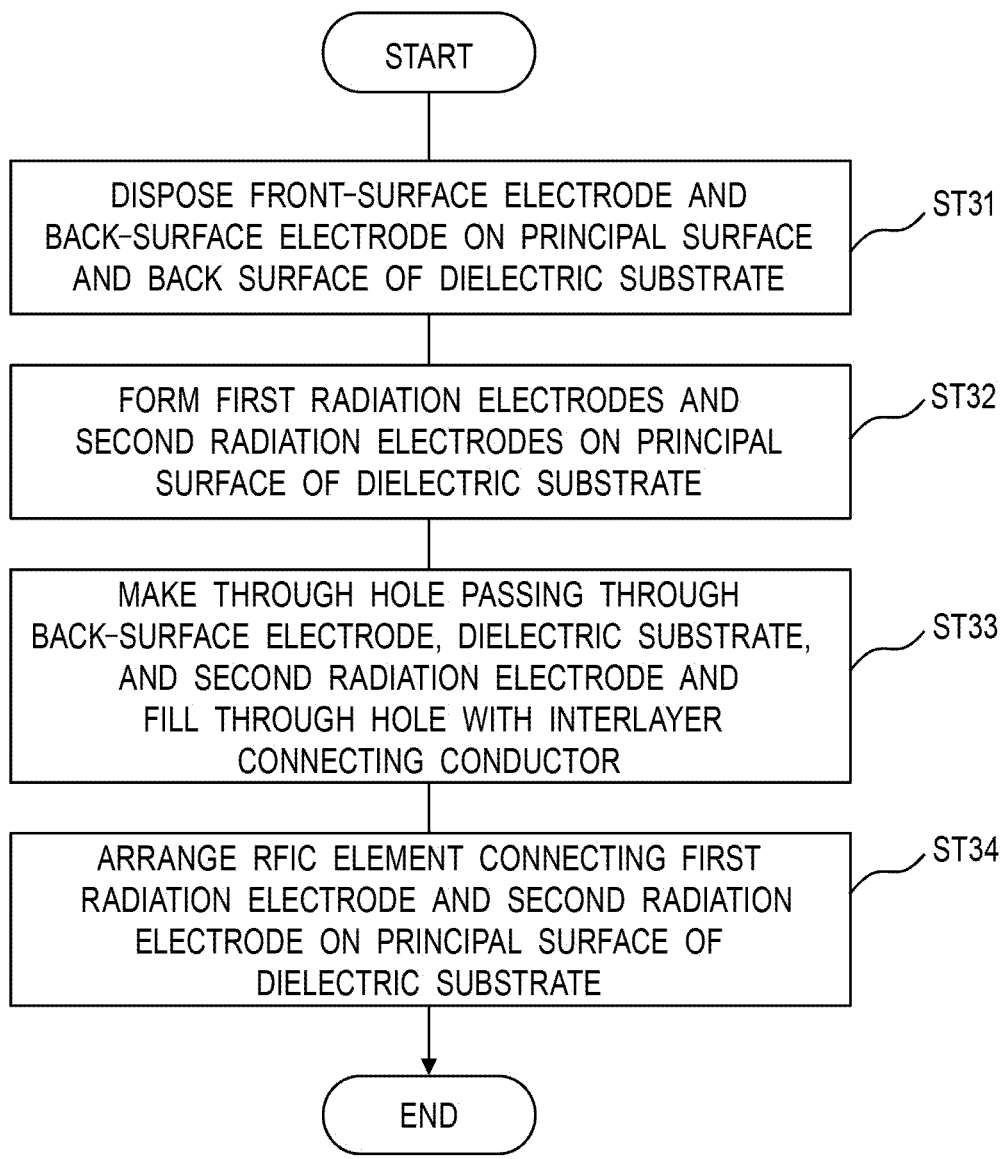
FIG. 13 is an exemplary flowchart of a process of forming the inlay sheet.

Formation of the inlay sheet 30 at step ST30 will be described with reference to FIGS. 13 and 14A to 14D. FIG. 13 is an exemplary flowchart of a process of forming the inlay sheet 30. FIGS. 14A to 14D show an example of the process of forming the inlay sheet 30.

Figure 14A:
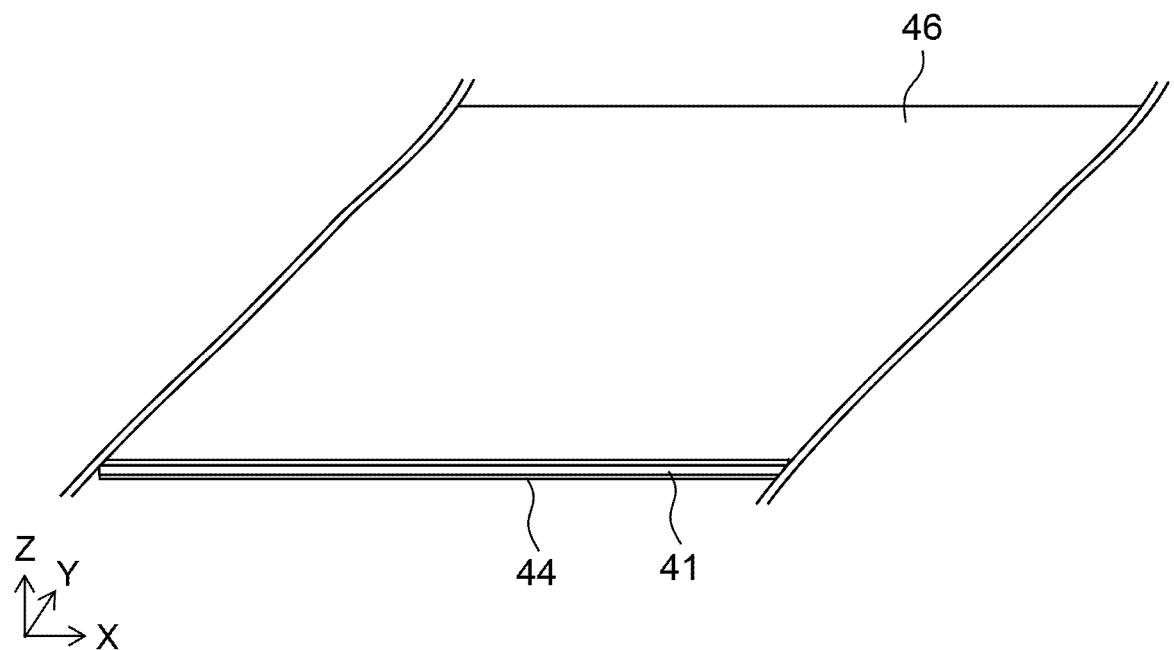
FIG. 14A is a diagram showing an example of the process of forming the inlay sheet.

As shown in FIGS. 13 and 14A, at step ST31, a front-surface electrode 46 and the back-surface electrode 44 are disposed on the principal surface PS1 and the back surface PS2, respectively, of the dielectric substrate 41. Specifically, the front-surface electrode 46 of a thin plate shape is disposed over substantially the entire surface of the principal surface PS1 of the dielectric substrate 41, while the thin-plate-shaped back-surface electrode 44 is disposed over substantially the entire surface of the back surface PS2 of the dielectric substrate 41.

Figure 14B:
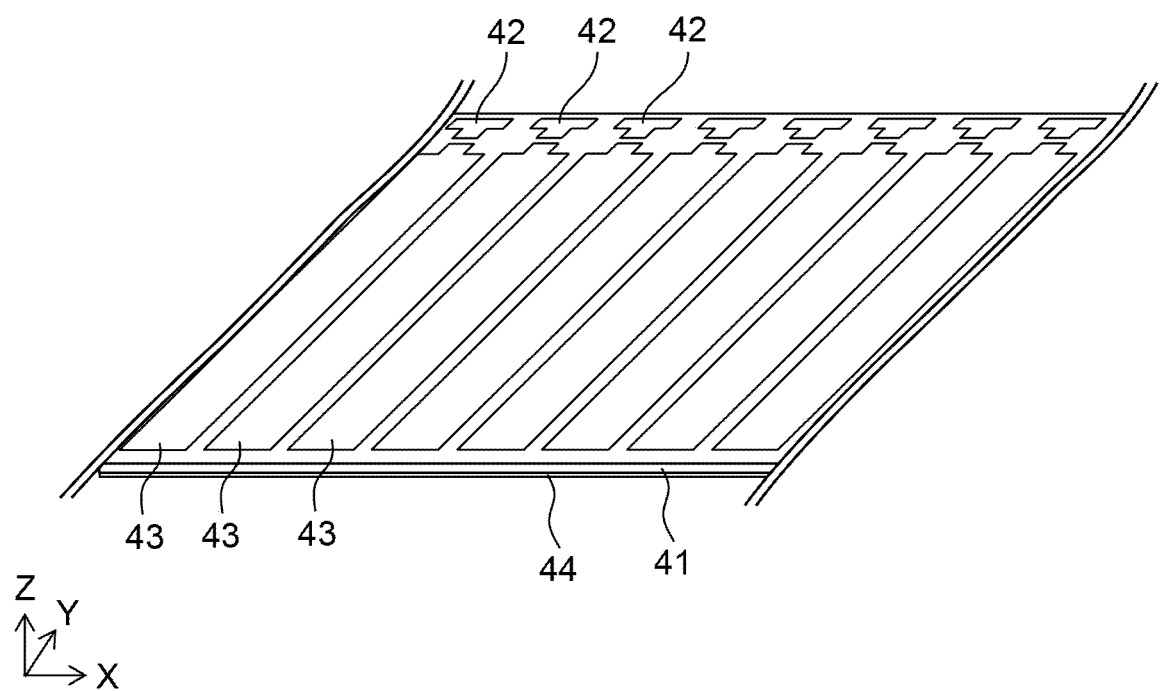
FIG. 14B is a diagram showing an example of the process of forming the inlay sheet.

As shown in FIGS. 13 and 14B, at step ST32, a plurality of the first radiation electrodes 42 and a plurality of the second radiation electrodes 43 are formed on the principal surface PS1 of the dielectric substrate 41. Specifically, the plurality of first radiation electrodes 42 and the plurality of second radiation electrodes 43 are formed by etching the front-surface electrode 46 on the principal surface PS1 of the dielectric substrate 41. The first radiation electrodes 42 and the second radiation electrodes 43 formed on the principal surface PS1 of the dielectric substrate 41 are arrayed in a line.

Figure 14C:
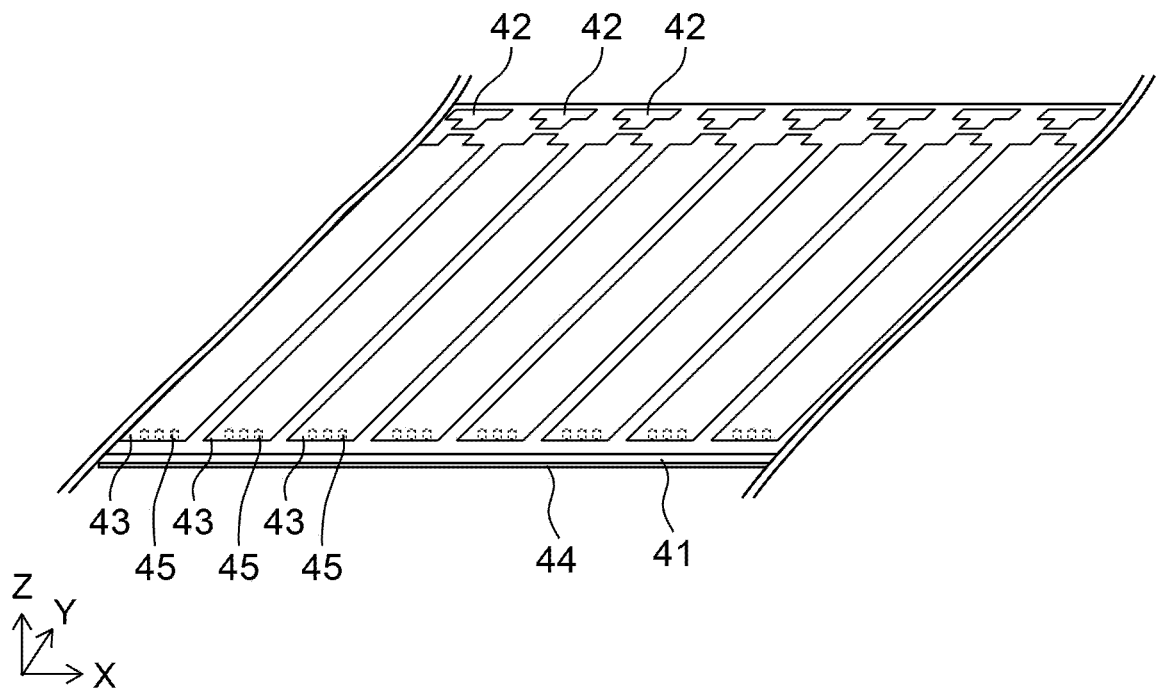
FIG. 14C is a diagram showing an example of the process of forming the inlay sheet.

As shown in FIGS. 13 and 14C, at step ST33, a through hole is provided that passes through the back-surface electrode 44, the dielectric substrate 41, and the second radiation electrode 43. The through hole is filled with the interlayer connecting conductor 45. This allows the second radiation electrode 43 formed on the principal surface PS1 of the dielectric substrate 41 and the back-surface electrode 44 formed on the back surface PS2 of the dielectric substrate 41 to be connected via the interlayer connecting conductor 45.

Figure 14D:
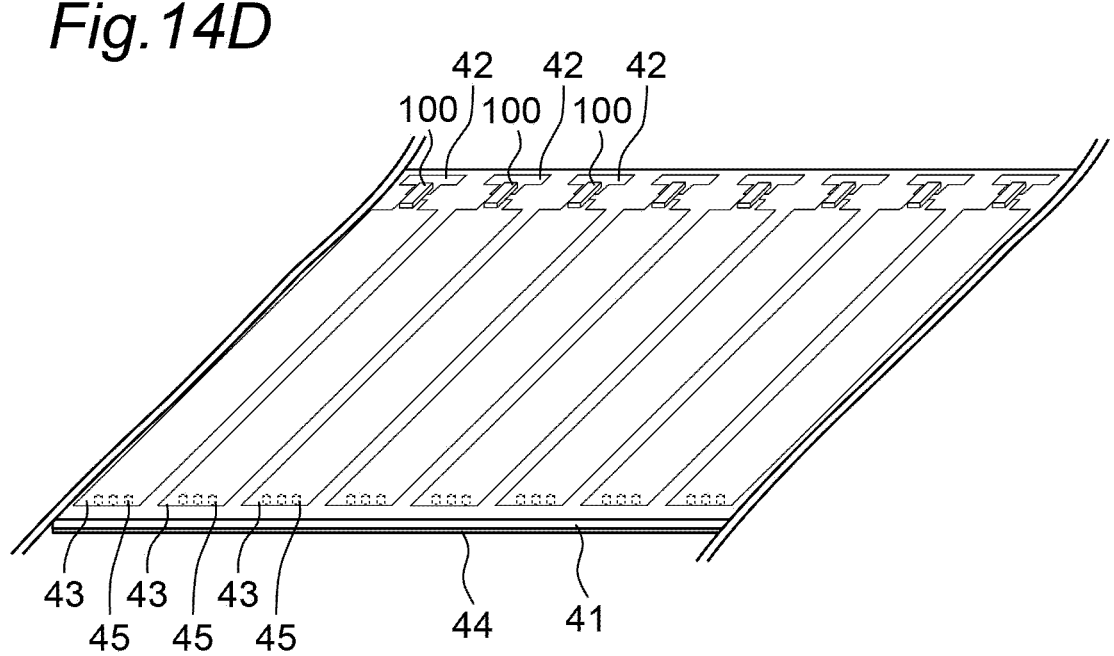
FIG. 14D is a diagram showing an example of the process of forming the inlay sheet.

As shown in FIGS. 13 and 14D, at step ST34, on the principal surface of the dielectric substrate 41 there is arranged the RFIC element 100 that connects the first radiation electrode 42 and the second radiation electrode 43. Specifically, the first input/output terminal 106a of the RFIC chip 106 of the RFIC element 100 is connected to the first radiation electrode 42 via the matching circuit 108 including the inductors L1 to L4. The second input/output terminal 106b of the RFIC chip 106 of the RFIC element 100 is connected to the second radiation electrode 43 via the matching circuit 108 including the inductors L1 to L4.

In this manner, the inlay sheet 30 is formed that has thereon the plurality of wireless communication devices 40 arrayed in a line.

Then, as shown in FIG. 12, at steps ST40 and ST50, the above communication method is used to communicate with the plurality of wireless communication devices 40 on the inlay sheet 30 formed at step ST30, to perform the inspections and information writing.

Steps ST40 and ST50 are the same as steps ST10 and ST20 of the communication method shown in FIG. 11, and hence description thereof will be omitted.

At step ST60, the plurality of wireless communication devices 40 arrayed on the inlay sheet 30 are individuated. FIG. 15 shows an example of a manufacturing process of the wireless communication device. As shown in FIG. 15, a portion of the inlay sheet 30 transported from the interior of the shield device 10 to the exterior thereof is cut through a cutting line Lc to thereby individually separate the wireless communication devices 40 from the inlay sheet 30. The cutting line Lc is a line drawn along the outer shape lines Ls defining the contours of the adjacent wireless communication devices 40 on the inlay sheet 30. That is, by cutting the inlay sheet 30 through the cutting line Lc at step ST60, the wireless communication devices 40 are separated into individual pieces without producing waste from the inlay sheet 30.

According to the communication apparatus 1A and communication method for the wireless communication device of the first embodiment, the following effects can be presented.

As described above, within the interior of the shield device 10, the communication apparatus 1A defines the plurality of shield spaces S1 to S4 and includes the transport path 12 through which the inlay sheet 30 having the wireless communication devices 40 arrayed thereon is transported into the plurality of shield spaces S1 to S4. The plurality of shield spaces S1 to S4 are juxtaposed corresponding to the array pitch Pd1 of the plurality of wireless communication devices 40 arrayed on the inlay sheet 30. Moreover, the reader/writer antenna(s) 20 are arranged in each of the plurality of shield spaces S1 to S4.

Such a configuration enables the simultaneous communication with the plurality of wireless communication devices 40 via the plurality of reader/writer antennas 20, which in turn shortens the time of communication with the plurality of wireless communication devices 40.

When the inlay sheet 30 is transported into the shield spaces S1 to S4 through the transport path 12, one reader/writer antenna 20 and one wireless communication device 40 are housed in each of the shield spaces S1 to S4. That is, a partition blocking radio waves is interposed between the adjacent wireless communication devices 40 on the inlay sheet 30.

Such a configuration allows the reader/writer antenna 20 arranged in each of the shield spaces S1 to S4 to communicate only with one wireless communication device 40 transported into the shield space corresponding thereto. That is, the reader/writer antenna 20 is less susceptible to radio waves from the adjacent reader/writer antennas 20 and/or to reflected waves from the adjacent wireless communication devices 40. As a result, the reader/writer antenna 20 enables accurate and speedy communication with the wireless communication device 40 to perform inspections and/or information writing.

Since the plurality of wireless communication devices 40 on the inlay sheet 30 can be densely arrayed, the margins between the adjacent wireless communication devices 40 can be reduced in width or eliminated altogether.

In the configuration that eliminates the margins between the adjacent wireless communication devices 40, the adjacent wireless communication devices 40 can share with each other the outer shape lines Ls defining the contours of the wireless communication devices 40. As a result, by cutting the inlay sheet 30 through the cutting line Lc along the outer shape lines Ls, the wireless communication devices 40 can be separated into individual pieces with almost no waste.

Since the plurality of wireless communication devices 40 can be densely arrayed on the inlay sheet 30, simultaneous communication with the plurality of wireless communication devices 40 is possible without increasing the size of the communication apparatus 1A. Thus, with a compact configuration, the communication apparatus 1A capable of efficiently communicating with the wireless communication devices 40 can be provided.

The reader/writer antenna 20 is a loop antenna whose loop surface is oriented in a direction intersecting the transport surface PSc of the transport path 12. Such a configuration allows the reader/writer antenna 20 to radiate radio waves toward the direction in which the wireless communication device 40 lies in each of the shield spaces S1 to S4, to thereby communicate with the wireless communication device 40. In consequence, the communication apparatus 1A can perform inspections of the wireless communication devices 40 including the communication range check in addition to the memory operation check.

If the loop surfaces of the reader/writer antennas 20a to 20d are oriented parallel to the transport direction D1 of the inlay sheet 30, the reader/writer antennas 20a to 20d are magnetic field coupled with the wireless communication devices 40. In this case, the communication apparatus 1A can perform inspections such as the memory operation check and encoding for the wireless communication device 40 having a magnetic field antenna.

In the communication apparatus 1A, the shield device 10 includes the plurality of boxes 11 having the plurality of side walls defining the plurality of shield spaces S1 to S4. The plurality of side walls of the plurality of boxes 11 each have the slit 14 that forms part of the transport path 12. Such a configuration improves shielding properties of the shield spaces S1 to S4 and make radio waves less likely to leak.

The boxes 11 can make the shield spaces S1 to S4 closed areas except for the transport path 12. This configuration suppresses the entry of noise from the outside of the shield device 10 and prevent radio waves radiated from the reader/writer antenna 20 from leaking out to the outside of the communication apparatus 1A, whereby it becomes possible to freely set the transmission/reception frequency of the reader/writer antenna 20 without violating the laws such as Radio Act of each country, for example, and to simply measure worldwide supported wireless communication devices 40.

At the entrance and the exit of the transport path 12, the shield device 10 includes the noise blocking members 13a and 13b that block noise. Such a configuration further suppresses the entry of noise from the outside of the shield device 10.

Although in the first embodiment the example of defining the four shield spaces S1 to S4 has been described, it should be appreciated that the number of the shield spaces is not limited to four. There may be two or more shield spaces. Since the number of the wireless communication devices 40 communicable at one time can increase according as the number of the shield spaces increases, the time of communication with the plurality of wireless communication devices 40 can be shortened.

Although in the first embodiment the example has been described where the shield device 10 is composed of the plurality of boxes 11 each having the top wall, the bottom wall, and the four side walls, this is not limitative. The shield device 10 is acceptable if radio waves cannot reach each other by the wall partitioning the adjacent wireless communication devices 40 on the inlay sheet 30. For example, the shield device 10 may not have the top surface and/or the bottom surface.

Although in the first embodiment the example has been described where part of the transport path 12 is formed by the slit 14 passing through the central portion of each of the plurality of boxes 11, this is not limitative.

Figure 16:
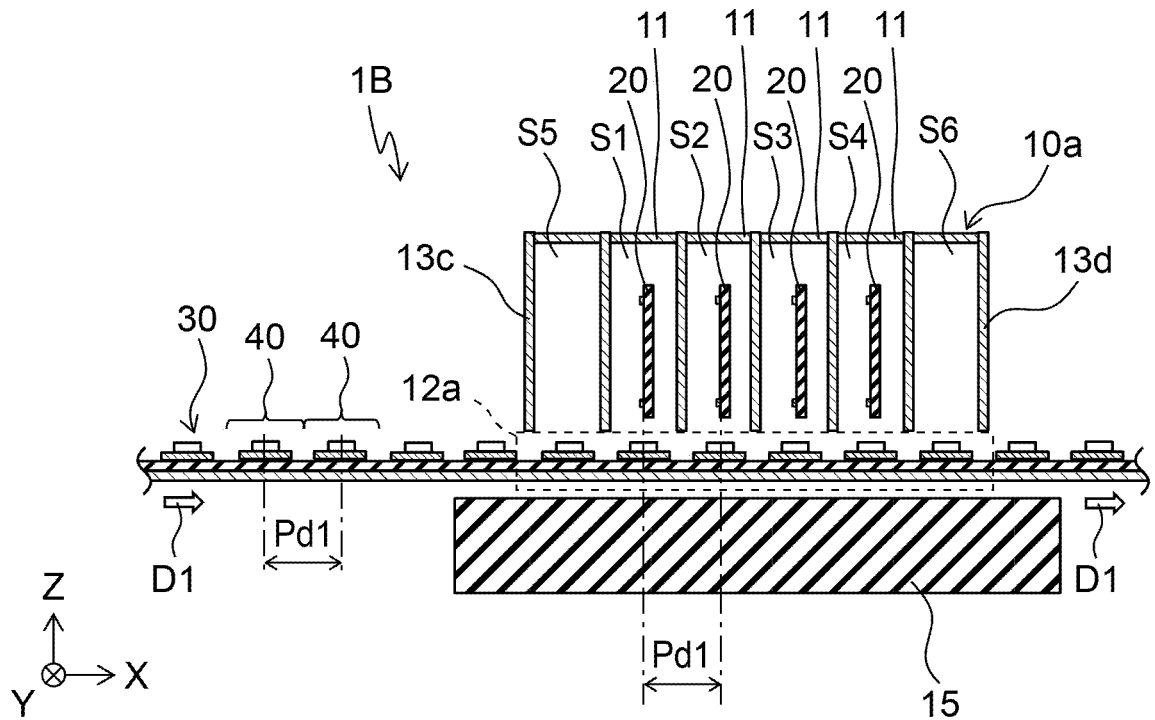
FIG. 16 is a schematic sectional configuration diagram of a communication apparatus of a variant of the first exemplary embodiment.

FIG. 16 is a schematic sectional configuration diagram of a communication apparatus 1B of a variant of the first exemplary embodiment. As shown in FIG. 16, a shield device 10a can include a plurality of boxes 11 each having no bottom wall, i.e., whose bottom is open, and a base 15 formed from a dielectric member. The plurality of boxes 11 include therewithin the shield spaces S1 to S4, respectively. In the shield device 10a, a transport path 12a is formed between the plurality of boxes 11 and the base 15. The shield device 10a includes noise blocking members 13c and 13d at an entrance and an exit of the transport path 12a.

Such a configuration ensures effective communication with the wireless communication devices 40 while reducing the size of the communication apparatus 1B.

Although in the first embodiment the example has been described where the noise blocking members 13a and 13b are disposed at the entrance and the exit of the transport path 12 of the shield device 10, this is not limitative. In the communication apparatus 1A, the noise blocking members 13a and 13b are not essential configuration elements in this exemplary aspect.

Although the first embodiment has been described where the noise blocking members 13a and 13b are boxes having the shield spaces S5 and S61, this is not limitative. The noise blocking members 13a and 13b can be, for example, plate-like members as long as they are members capable of blocking noise.

Although in the first embodiment the example has been described where step ST20 of communicating in the communication method includes step ST21 of writing and/or reading inspection data, step ST22 of measuring the RSSI strength, and step ST23 of encoding the wireless communication device 40, this is not limitative. At step ST20 of communicating, at least one of steps ST21 to ST23 may be executed.

Although the first embodiment has been described of the wireless communication device 40 including the first radiation electrode 42, the second radiation electrode 43, and the back-surface electrode 44 shown in FIG. 5A, this is not limitative. Any wireless communication device can be implemented as long as it can be arrayed on the inlay sheet 30.

Figure 17:
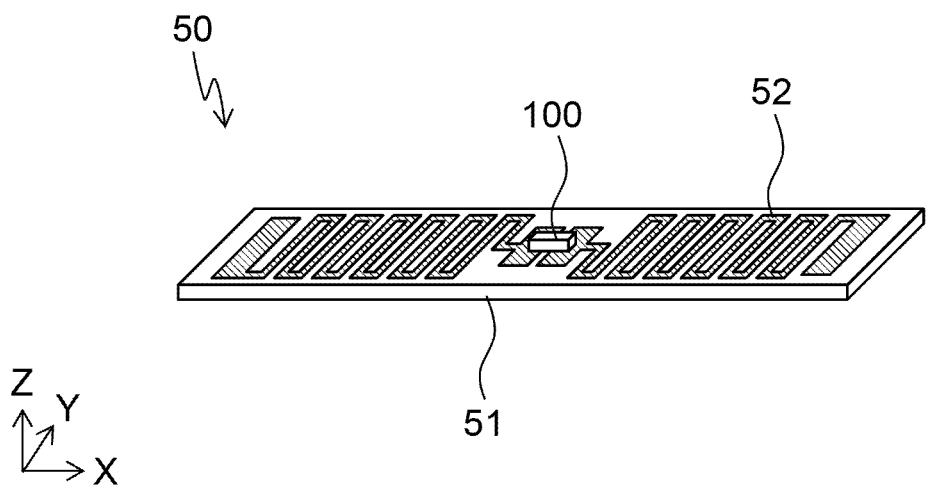
FIG. 17 is a schematic perspective view of an example of another wireless communication device.

FIG. 17 is a schematic perspective view of an example of another wireless communication device 50. FIG. 17 shows the wireless communication device 50 including a dipole type antenna. The communication apparatus and the communication method of the exemplary aspects are applicable also to the wireless communication device 50 including the dipole type antenna shown in FIG. 17.

The wireless communication device 50 includes the RFIC element 100 and a dipole antenna S2 connected to the RFIC element 100. Specifically, in the wireless communication device 50, two antenna patterns forming the dipole antenna S2 are formed in a meandering shape on a principal surface of a dielectric substrate S1 and are connected to the RFIC element 100. The RFIC element 100 and the dipole antenna S2 are connected via a matching inductor to achieve impedance matching.

Figure 18:
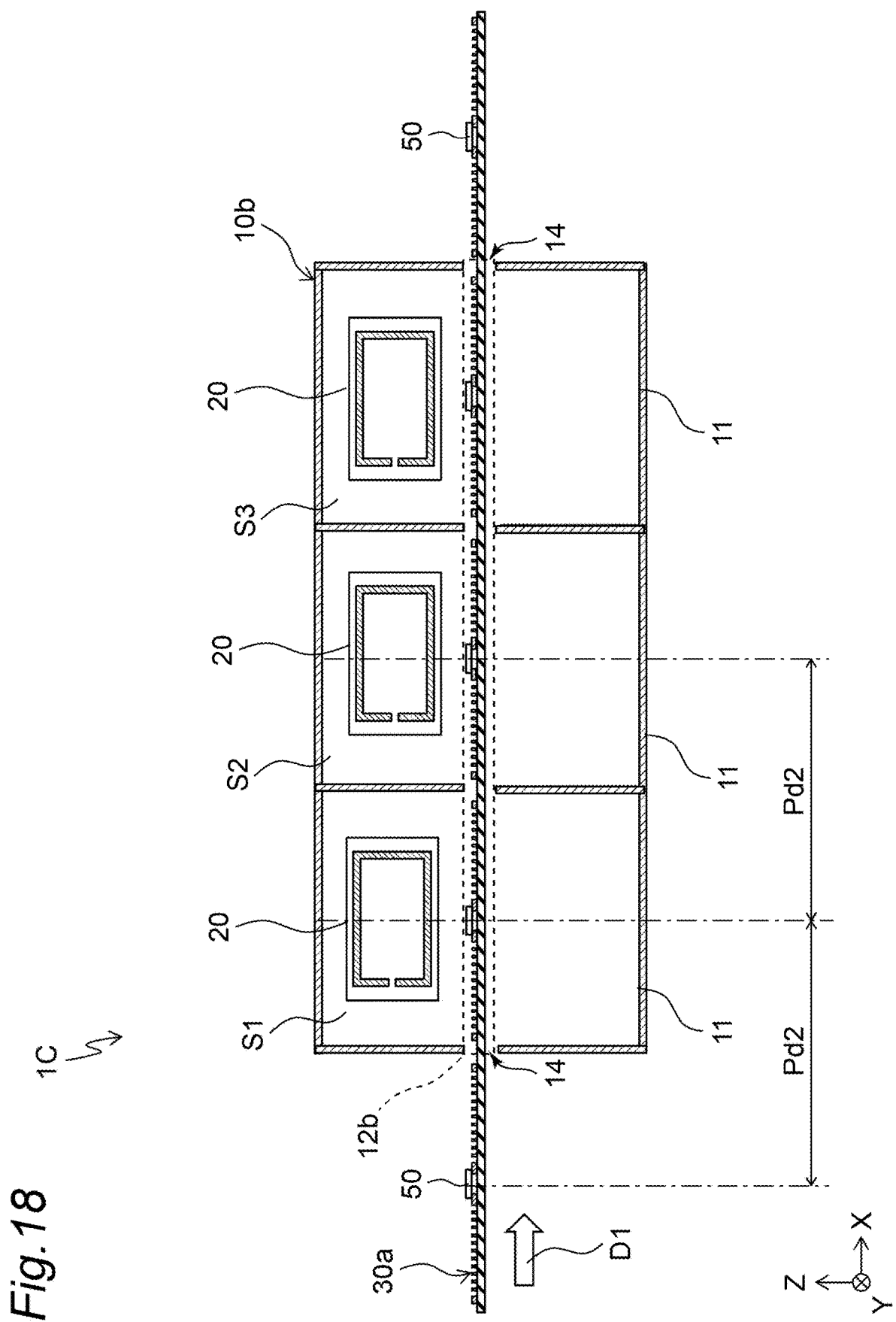
FIG. 18 is a schematic longitudinal section view of a communication apparatus of a variant of the first exemplary embodiment.
Figure 19:
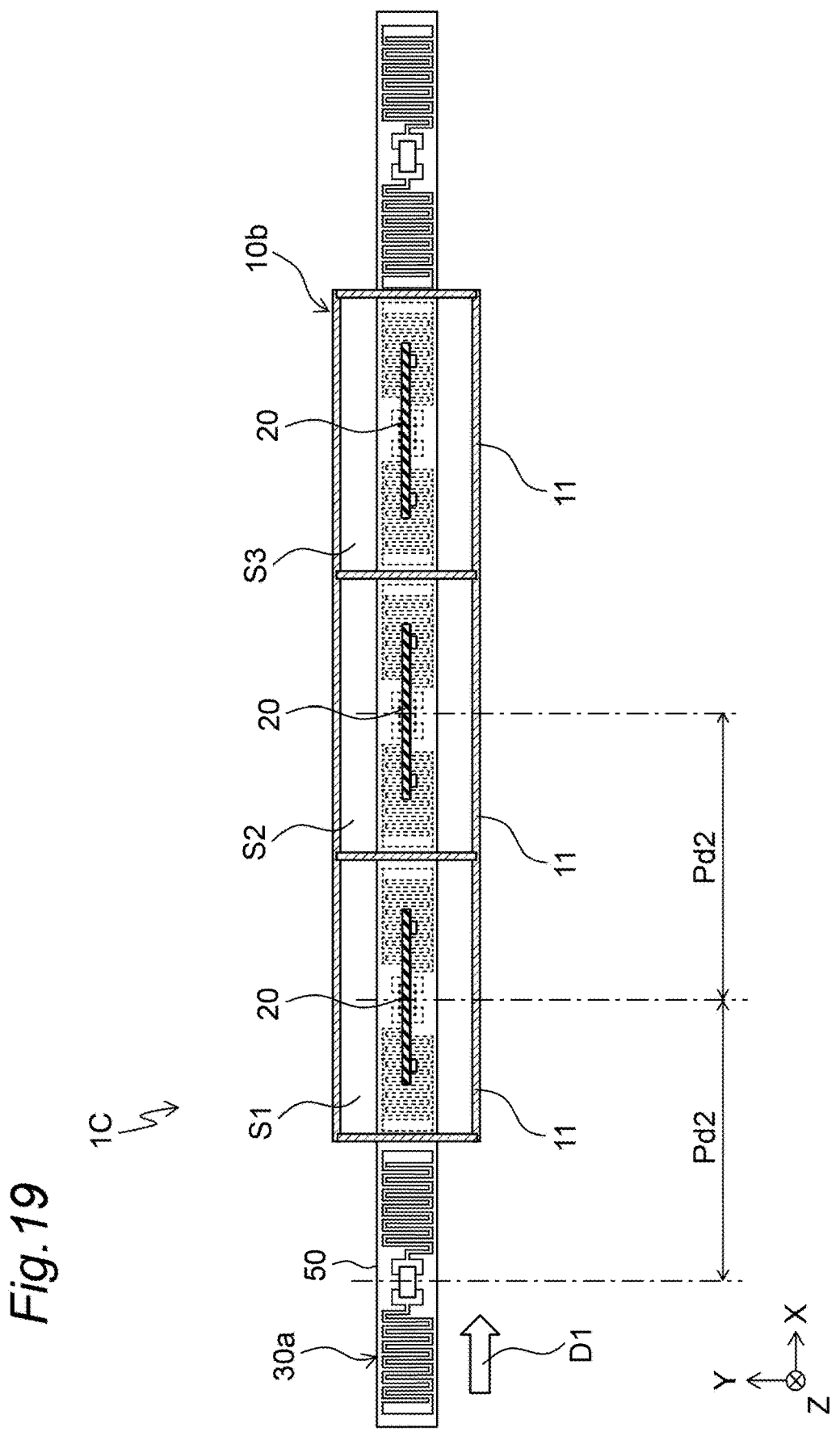
FIG. 19 is a schematic plan section view of the communication apparatus of the variant of the first exemplary embodiment.

FIG. 18 is a schematic longitudinal section view of a communication apparatus 1C of a variant of the first exemplary embodiment. FIG. 19 is a schematic plan section view of the communication apparatus 1C of the variant of the first exemplary embodiment. FIGS. 18 and 19 show a configuration of the communication apparatus 1C communicating with an inlay sheet 30a on which a plurality of the wireless communication devices 50 shown in FIG. 17 are arrayed.

As shown in FIGS. 18 and 19, the plurality of wireless communication devices 50 are arrayed in the longitudinal direction of the wireless communication device 50 on the inlay sheet 30a. In the communication apparatus 1C, shield spaces S1 to S3 within the shield device 10b are juxtaposed corresponding to an array pitch Pd2 of the plurality of wireless communication devices 50 arrayed on the inlay sheet 30a.

Figure 20:
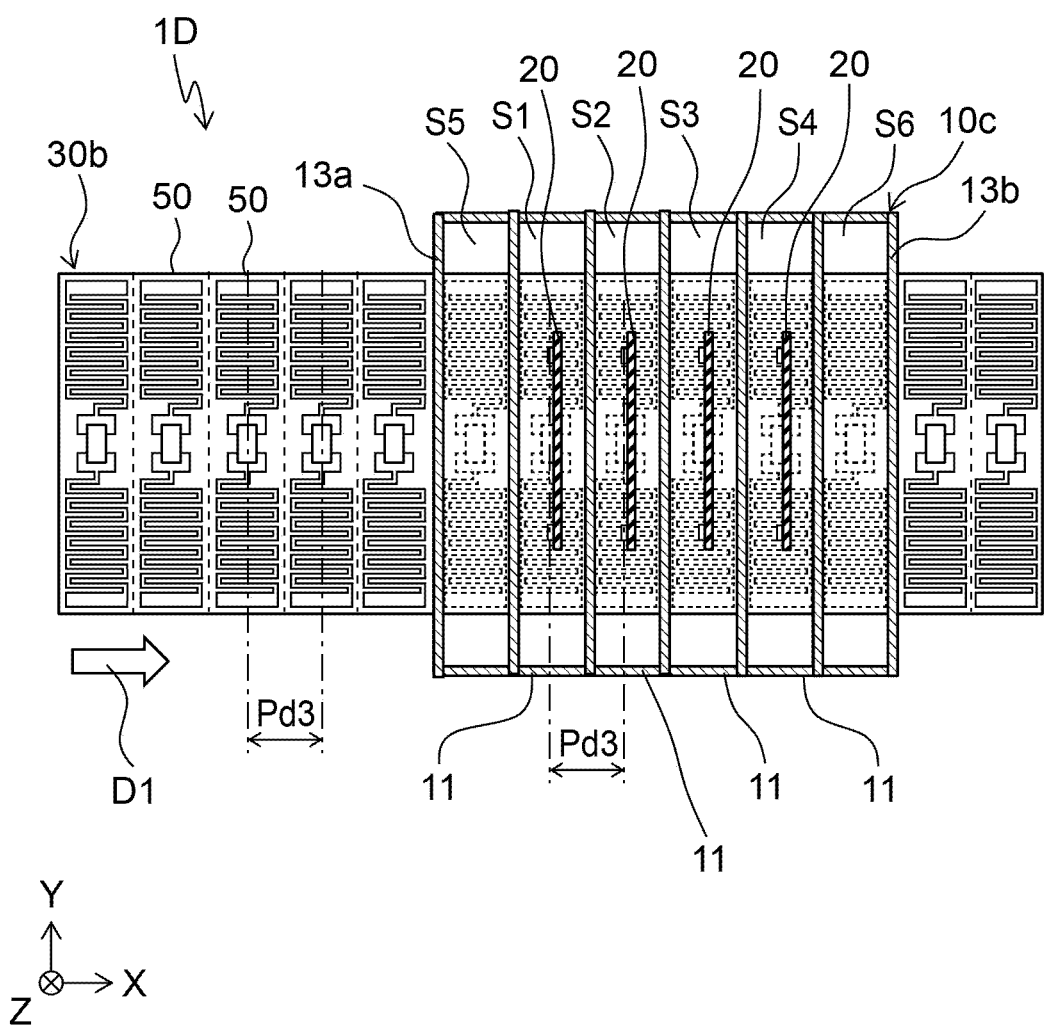
FIG. 20 is a schematic plan section view of the communication apparatus of a variant of the first exemplary embodiment.

FIG. 20 is a schematic plan section view of a communication apparatus 1D of a variant of the first exemplary embodiment. As shown in FIG. 20, in the communication apparatus 1D, the plurality of wireless communication devices 50 are arrayed in a line, toward the lateral direction of the wireless communication device 50, on an inlay sheet 30b. In the communication apparatus 1D, the shield spaces S1 to S3 within the shield device 10b are juxtaposed corresponding to an array pitch Pd3 of the plurality of wireless communication devices 50 arrayed on the inlay sheet 30b.

Such a configuration ensures effective communication with the wireless communication device 50 including the dipole type antenna.

Although in the first embodiment the example has been described where the plurality of wireless communication devices 40 are arranged on the inlay sheet 30, this is not limitative. The plurality of wireless communication devices 40 may be arranged on any transportable sheet. For example, the plurality of wireless communication devices 40 may be arranged as the RFID tags on a carrier sheet.

Although in the first embodiment the example has been described where the manufacturing method of the wireless communication device 40 includes step ST60 of individuating the plurality of wireless communication devices 40, this is not limitative. For example, a sheet may be produced on which the plurality of wireless communication devices 40 are arranged without being individuated. That is, the manufacturing method of the wireless communication device 40 may not include step ST60 of individuating.

Figure 21:
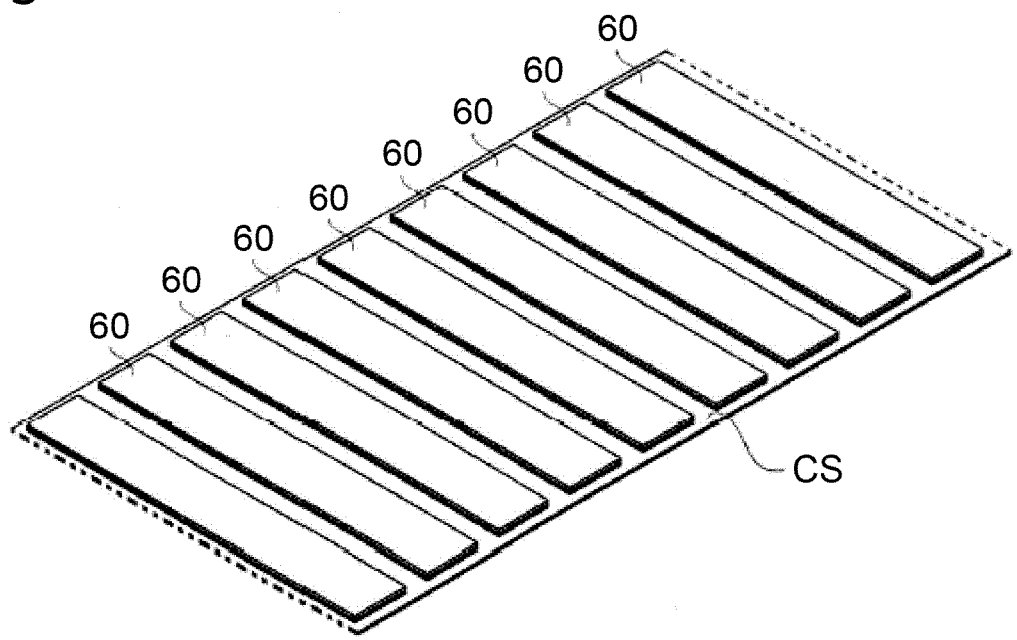
FIG. 21 is a schematic perspective view of an example of an RFID tag in the variant of the first exemplary embodiment.
Figure 22:
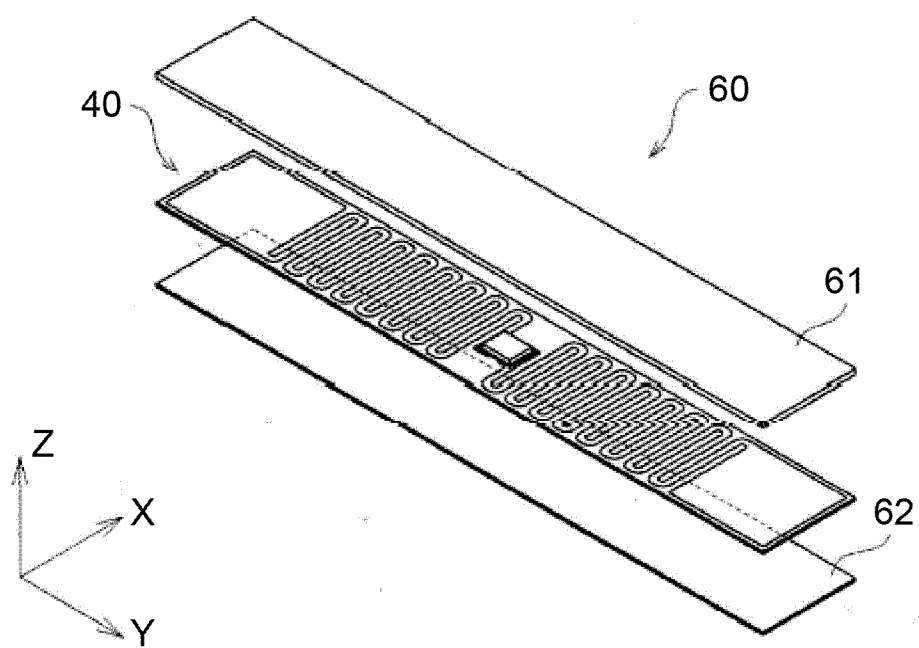
FIG. 22 is an exploded perspective view of the RFID tag shown in FIG. 21.

FIG. 21 is a schematic perspective view of an example of an RFID tag 60 in a variant of the first exemplary embodiment. FIG. 22 is an exploded perspective view of the RFID tag 60 shown in FIG. 21. As shown in FIG. 21, a plurality of RFID tags 60 composed of the wireless communication devices 40 are peelably stuck to a carrier sheet CS. As shown in FIG. 22, the RFID tag 60 is composed of the wireless communication device 40 as its main body, a label seal 61 covering and protecting the antenna patterns, etc. on the wireless communication device 40, and an adhesive layer 62 for adhering the RFID tag 60 to the carrier sheet CS or to an article to which the RFID tag 60 is attached.

In this manner, the plurality of wireless communication devices 40 can be arranged on a sheet, such as the carrier sheet CS or a label sheet, without being limited to the inlay sheet 30. Such a configuration also ensures the same effects as those of the communication apparatus 1A and the communication method of the above first embodiment.

Second Exemplary Embodiment

A communication apparatus according to a second exemplary embodiment will be described. In the second embodiment, differences from the first embodiment will mainly be described. In the second embodiment, the same or equivalent configuration elements to those in the first embodiment will be described with the same reference numerals. In the second embodiment, descriptions overlapping with those of the first embodiment will be omitted.

Figure 23:
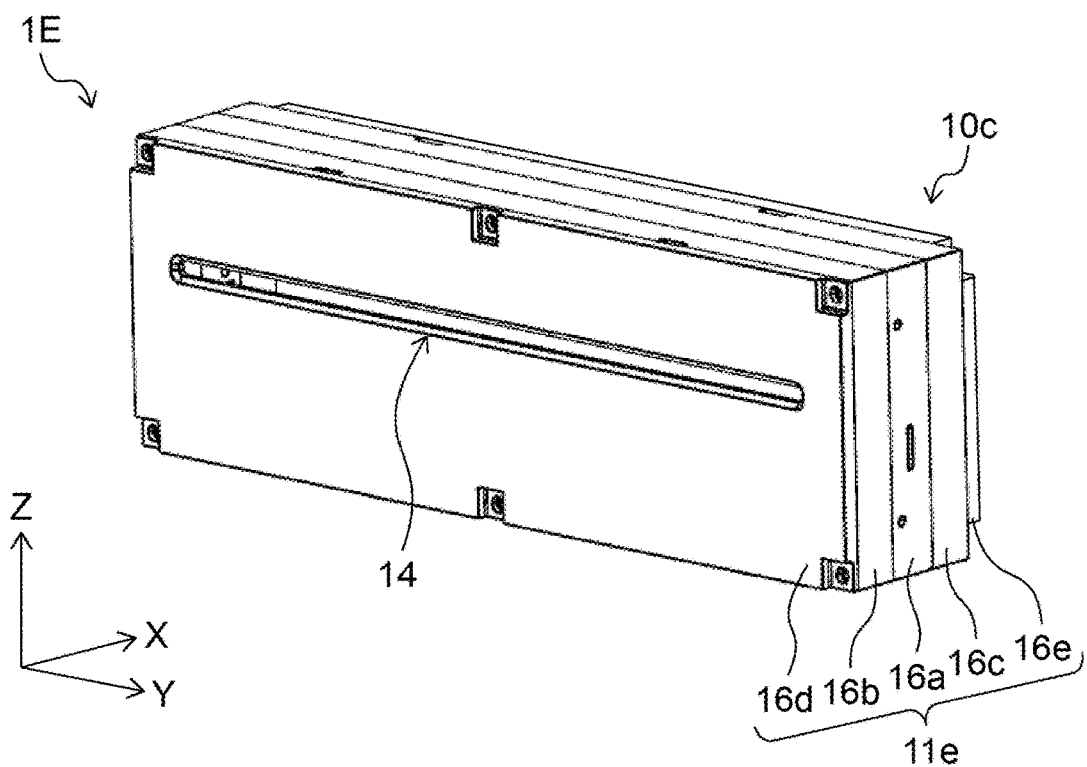
FIG. 23 is a schematic perspective view showing a communication apparatus of a second exemplary embodiment.
Figure 24:
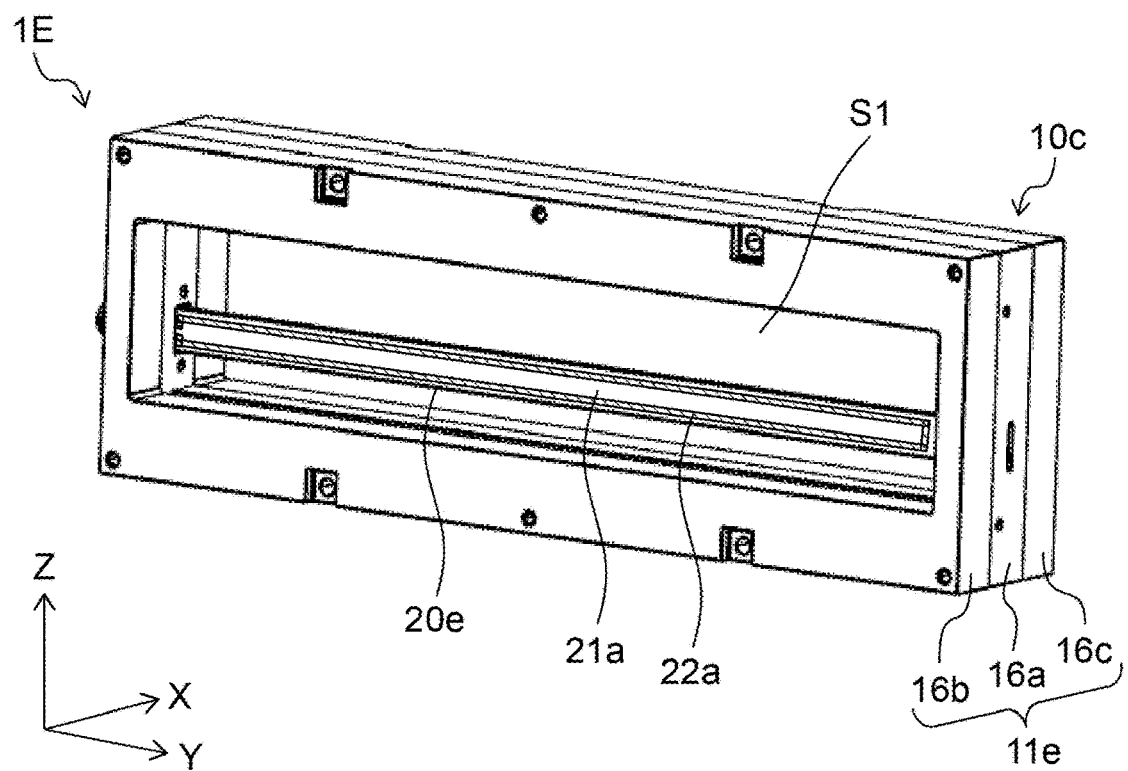
FIG. 24 is a schematic perspective view of the communication apparatus of FIG. 23 with its side walls removed.
Figure 25:
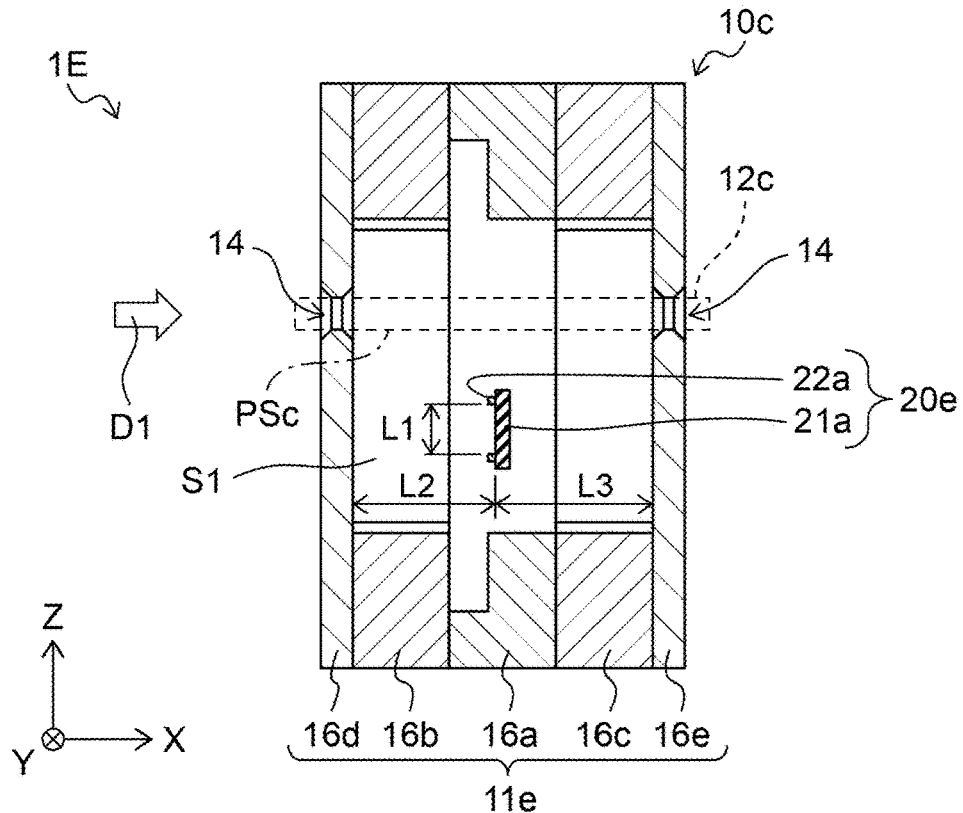
FIG. 25 is a schematic section view of the communication apparatus of FIG. 23.

FIG. 23 is a schematic diagram of an example of a communication apparatus 1E of the second exemplary embodiment. FIG. 24 is a schematic perspective view of the communication apparatus of FIG. 23 with its side walls removed. FIG. 25 is a schematic section view of the communication apparatus 1E of FIG. 23. In FIGS. 23 to 25, for ease of description, a shield device 10e composed of a single box 11e is shown, but in the exemplary configuration, the shield device 10e is composed of a plurality of boxes 11e.

The second embodiment differs from the first embodiment in that the reader/writer antenna 20 has a longitudinal direction and that a shield device 10c includes a frame-shaped main body 16a and a plurality of frame-shaped spacers 16b and 16c.

As shown in FIGS. 23 to 25, in the communication apparatus 1E, a reader/writer antenna 20e has a longitudinal direction. Specifically, the reader/writer antenna 20e has the longitudinal direction in Y direction and a lateral direction in Z direction.

The reader/writer antenna 20e includes a plate-shaped substrate 21a having a longitudinal direction, and a loop antenna pattern 22a that is arranged in a loop shape on the substrate 21a. The substrate 21a has the longitudinal direction in Y direction, a lateral direction in Z direction, and a thickness direction in X direction. For this reason, the loop surface of the substrate 21a having the loop antenna pattern arranged thereon has the longitudinal direction in Y direction and the lateral direction in Z direction.

In the communication apparatus 1E, the shield device 10c includes the main body 16a, the plurality of spacers 16b and 16c, and a plurality of plates 16d and 16e. The main body 16a, the spacers 16b and 16c, and the plates 16d and 16e make up the box 11e that defines the shield space S1 therein.

As shown, the main body 16a has a frame shape. In the second embodiment, the main body 16a is formed in a rectangular frame shape when viewed from the transport direction D1. The main body 16a has a longitudinal direction in Y-axis direction, a lateral direction in Z-direction, and a thickness direction in X direction. The reader/writer antenna 20e is arranged within the interior of the main body 16a and is also arranged below a transport path 12c. The loop surface of the reader/writer antenna 20e is arranged in a direction intersecting the transport surface PSc of the transport path 12c. That is, the loop surface of the reader/writer antenna 20e intersects the transport direction D1 in which the inlay sheet 30 is transported. In the second embodiment, the loop surface of the reader/writer antenna 20e is arranged in a direction orthogonal to the transport surface PSc of the transport path 12.

The plurality of spacers 16b and 16c have a frame shape. In the second embodiment, the plurality of spacers 16b and 16c are formed in a rectangular frame shape when viewed from the transport direction D1. The plurality of spacers 16b and 16c have a longitudinal direction in Y-axis direction, a lateral direction in Z direction, and a thickness direction in X direction. The plurality of spacers 16b and 16c are arranged in the thickness direction (X direction) of the main body 16a. Moreover, the main body 16a is sandwiched between the plurality of spacers 16b and 16c. The plurality of spacers 16b and 16c are removably attached to the main body 16a.

The plurality of plates 16d and 16e have a plate shape. In the second embodiment, the plurality of plates 16d and 16e are formed in a rectangular shape when viewed from the transport direction D1. The plurality of plates 16d and 16e have a longitudinal direction in Y-axis direction, a lateral direction in Z direction, and a thickness direction in X direction. The plurality of plates 16d and 16e are arranged on the plurality of spacers 16b and 16c, respectively, and are also arranged so as to close openings of the plurality of spacers 16b and 16c, respectively. In the exemplary aspect, the plurality of plates 16d and 16e are removably attached to the plurality of spacers 16b and 16c.

In this manner, in the shield device 10c, the main body 16a, the spacers 16b and 16c, and the plates 16d and 16e form the box 11e that defines the shield space S1 therein. In other words, the main body 16a, the spacers 16b and 16c, and the plates 16d and 16e make up the top surface, the bottom surface, and the side walls of the 11e.

The plurality of plates 16d and 16e each have the slit 14. The slit 14 has a longitudinal direction. Specifically, the slit 14 has the longitudinal direction in Y-axis direction and a lateral direction in Z direction. The longitudinal dimension of the slit 14 is smaller than the longitudinal dimension of the loop surface of the reader/writer antenna 20e. The slit 14 forms part of the transport path 12c.

In the reader/writer antenna 20e, the loop antenna pattern 22a includes antenna patterns confronting each other in a direction intersecting the transport surface PSc of the transport path 12c. A length L1 between the confronting antenna patterns is smaller lengths L2 and L3 between the loop surface and the plurality of plates 16d and 16e, respectively, of the box 11e in the thickness direction (X direction) of the substrate 21a. In other words, the length L1 between the confronting antenna patterns is smaller than the lengths L2 and L3 between the loop surface and the plurality of side walls 16d and 16e, respectively, of the box 11e in the thickness direction (X direction) of the substrate 21a. For example, the lengths L2 and l3 are one time or more and ten times or less the length L1. Preferably, the lengths L2 and L3 are two times or more and five times or less the length L1. More preferably, the lengths L2 and L3 are two times or more and four times or less.

By making the length L1 smaller than the lengths L2 and L3, magnetic fields generated from the loop antenna can be suppressed from reaching the plurality of plates 16d and 16e. In addition, the plurality of plates 16d and 16e can be shared with the adjacent boxes 11e.

The lengths L2 and L3 are variable by adjusting the thicknesses of the plurality of spacers 16b and 16c. For example, a plurality of spacers with different thicknesses may be prepared so that the plurality of spacers 16b and 16c can be selected depending on the length L1.

According to the communication apparatus 1E of the wireless communication device of the second exemplary embodiment, the following effects can be presented.

In particular, in the communication apparatus 1E, the reader/writer antenna 20e has the longitudinal direction. Such a configuration ensures easy communication with the plurality of wireless communication devices 40. Specifically, the inlay sheet 30 of any size is selected depending on the dimensions of the wireless communication device 40. By imparting the longitudinal direction to the reader/writer antenna 20e, the wireless communication device 40 can have an increased communicable range. For this reason, it is possible to easily communicate with the plurality of wireless communication devices 40 arranged on the inlay sheet 30 of various dimensions. This ensures effective communication with the wireless communication device 40.

The shield device 10c includes the box 11e having the plurality of side walls that define the shield space S1. The loop antenna includes the substrate 21a, and the loop antenna pattern 22a arranged in a loop shape on the substrate 21a. The loop antenna pattern 22a includes the antenna patterns confronting each other in a direction intersecting the transport surface PSc of the transport path 12c. The length L1 between the confronting antenna patterns is smaller than the lengths between the loop surface and the plurality of side walls 16d and 16e of the plurality of boxes 11a in the thickness direction (X direction) of the substrate 21a. Such a configuration suppresses magnetic fields generated from the loop antenna from reaching the plurality of side walls 16d and 16e. This leads to improved shielding properties of the boxes 11a.

Moreover, the shield device 10c includes the frame-shaped main body 16a on which the reader/writer antenna 20e is arranged, and the plurality of frame-shaped spacers 16b and 16c adjacent to the main body 16a. Such a configuration enables the dimensions of the shield space S1 to be adjusted by changing the thicknesses of the plurality of spacers 16b and 16c.

Although the second embodiment has been described where the reader/writer antenna 20e is arranged below the transport path 12c, this is not limitative. For example, the reader/writer antenna 20e can be arranged above the transport path 12c in an alternative aspect.

Although the second embodiment has been described where the loop surface of the reader/writer antenna 20e is arranged in a direction orthogonal to the transport surface PSc of the transport path 12c, this is not limitative. For example, the loop surface of the reader/writer antenna 20e can be arranged in any direction orthogonal to the transport surface PSc of the transport path 12c.

Although the second embodiment has been described where the main body 16a, the plurality of spacers 16b and 16c, and the plurality of plates 16d and 16e are formed from separate members, respectively, this is not limitative. For example, the main body 16a and the plurality of spacers 16b and 16c may be integrally formed. Otherwise, the spacer 16b and the plate 16d may be integrally formed, or the spacer 16c and the plate 16e may be integrally formed.

Although in the second embodiment, the communication apparatus 1E has been mainly described, the communication method may include a step of adjusting the thicknesses of the plurality of spacers 16b and 16c, based on the length L1 between the confronting antenna patterns of the loop antenna pattern 22a. For example, the length L1 between the confronting antenna patterns is made smaller than the lengths L2 and L3 between the loop surface and the plurality of side walls 16d and 16e of the plurality of boxes 11e in the thickness direction (X direction) of the substrate 21a. This configuration suppresses magnetic fields generated from the loop antenna from reaching the plurality of side walls 16d and 16e. As a result, the shielding properties of the boxes 11e can be improved.

Figure 26:
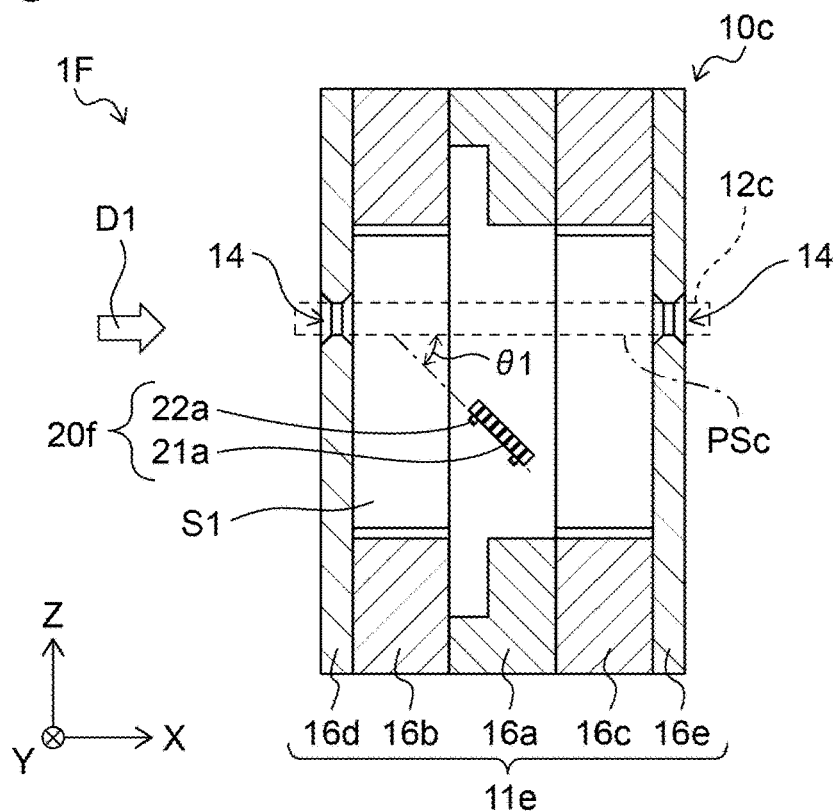
FIG. 26 is a schematic section view showing a communication apparatus of a variant of the second exemplary embodiment.

FIG. 26 is a schematic section view showing a communication apparatus 1F of a variant of the second exemplary embodiment. As shown in FIG. 26, in the communication apparatus 1F, the loop surface of a reader/writer antenna 20f is arranged slantingly with respect to the transport surface PSc of the transport path 12c. Specifically, the loop surface of the reader/writer antenna 20f is arranged slantingly toward a direction opposite to the transport direction D1 around an axis parallel to the Y-axis direction. The loop surface of the reader/writer antenna 20f may be arranged slantingly toward the transport direction D1 around the axis parallel to Y-axis direction.

The loop surface of the reader/writer antenna 20f is arranged with an angle θ1 relative to the transport surface PSc of the transport path 12c. For example, the angle θ1 is 20 degrees or more and 80 degrees or less. Preferably, the angle θ1 is 35 degrees or more and 55 degrees or less. More preferably, the angle θ1 is 43 degrees or more and 47 degrees or less.

By virtue of such a configuration, communication is feasible irrespective of the array direction of the plurality of wireless communication devices 40 arrayed on the inlay sheet 30. Communication is feasible in either case of the case where the plurality of wireless communication devices 40 are arrayed in the longitudinal direction of the wireless communication device 40 on the inlay sheet 30 or the case where the plurality of wireless communication devices 40 are arrayed in the lateral direction of the wireless communication device 40 on the inlay sheet 30.

Specifically, by arranging the loop surface of the reader/writer antenna 20f slantingly with respect to the transport surface PSc of the transport path 12c, a magnetic field slant with respect to transport surface PSc of the transport path 12c occurs from the loop surface of the reader/writer antenna 20f. This makes communication feasible irrespective of the array direction of the plurality of wireless communication devices 40. Mutual interference becomes small between the reader antennas in the adjacent ones of the shield spaces S1 to S4, enabling further reduction in the lengths L2 and L3 between the loop surface and the plurality of plates 16d and 16e.

In general, it is noted that although the present invention has been fully described in relation to the exemplary embodiments referring to the accompanying drawings, various variations or modifications will be apparent to those skilled in the art.

The exemplary embodiments of the present invention are useful for communicating with a wireless communication device to perform inspections and/or information writing.

EXPLANATIONS OF REFERENCES 1A, 1B, 1C, 1D, 1E, 1F communication apparatus
10, 10a, 10b, 10c shield device
11, 11a, 11b, 11c, 11d, 11e box
12, 12a, 12b, 12c transport path
13a, 13b, 13c, 13d noise blocking member
14 slit
15 base
16a main body
16b spacer
16c spacer
16d plate
16e plate
20, 20a, 20b, 20c, 20d, 20e, 20f reader/writer antenna
21m 21a substrate
22, 22a loop antenna pattern
30, 30a, 30b inlay sheet
40 wireless communication device
41 dielectric substrate (dielectric member)
42 first radiation electrode
42a land part
43 second radiation electrode
43a land part
44 back-surface electrode
45 interlayer connecting conductor
46 front-surface electrode
50 wireless communication device
51 dielectric substrate (dielectric member)
52 dipole antenna
60 RFID tag
61 label seal
62 adhesive layer
100 RFIC element
102 first terminal electrode
104 second terminal electrode
106 RFIC chip
106a first input/output terminal
106b second input/output terminal
108 matching circuit
120 multi-layer substrate
122 power supply circuit
124 coil conductor
124a, 124b, 124c coil pattern
126, 128, 130, 132 interlayer connecting conductor
134, 136 dummy conductor
CIL1 first coil part
CIL2 second coil part
CIL3 third coil part
CIL4 fourth coil part
CS carrier sheet
D1 transport direction
L1, L2, L3, L4 inductor
HL1 through hole
La1 length of first radiation electrode
La2 length of second radiation electrode
Wa1 width of first radiation electrode
Wa2 width of second radiation electrode
Lc cutting line
Ls outer shape line
P1 first position
P2 second position
Pd1, Pd2, Pd3 array pitch
PS1 principal surface (front surface) of dielectric substrate
PS2 back surface of dielectric substrate
PSc transport surface
S1, S2, S3, S4, S5, S6 shield space
T1 first coil end
T2 second coil end

The invention claimed is:

1. A communication apparatus for communicating with wireless communication devices, comprising:
  a shield device that defines a plurality of shield spaces arranged along a transport path for transporting a sheet having a plurality of wireless communication devices arrayed thereon, wherein the plurality of shield spaces are defined by a plurality of boxes enclosing the transport path, wherein each box of the respective shield space comprises a top surface, a bottom surface, and a plurality of side walls; and
  a plurality of reader/writer antennas that are each disposed in the plurality of shield spaces, respectively, and are arranged at a side facing a transport surface of the transport path,
  wherein the plurality of shield spaces are juxtaposed corresponding to an array pitch between the plurality of wireless communication devices arrayed on the sheet, and wherein a part of the shield device is disposed between the plurality of reader/writer antennas.

2. The communication apparatus of claim 1, wherein the plurality of reader/writer antennas each include a loop antenna having a loop surface in a direction intersecting the transport surface of the transport path.

3. The communication apparatus of claim 1, wherein the wireless communication device comprises:
an RFIC element;
a matching inductor connected to the RFIC element; and
a dipole antenna connected to the matching inductor.

4. The communication apparatus of claim 1, wherein the wireless communication device comprises:
a dielectric member;
an RFIC element disposed on a front surface of the dielectric member and including a first terminal electrode and a second terminal electrode;
a first radiation electrode disposed on the front surface of the dielectric member and connected to the first terminal electrode of the RFIC element;
a second radiation electrode disposed on the front surface of the dielectric member and connected to the second terminal electrode of the RFIC element independently of the first radiation electrode; and
a back-surface electrode disposed on a back surface of the dielectric member and connected to the second radiation electrode via an interlayer connecting conductor.

5. The communication apparatus of claim 4, wherein the RFIC element is connected to a matching inductor, and the first radiation electrode and the second radiation electrode are connected to the matching inductor.

6. The communication apparatus of claim 1, wherein:
the plurality of side walls of the plurality of boxes each include a slit, and
the slit of each of the plurality of side walls forms part of the transport path.

7. The communication apparatus of claim 1, wherein the shield device comprises a noise blocking member configured to block noise at an entrance and an exit of the transport path.

8. The communication apparatus of claim 1, wherein adjacent ones of the plurality of wireless communication devices share with each other an outer shape line defining contours of the respective wireless communication devices on the sheet.

9. The communication apparatus of claim 2,
wherein the loop antenna comprises a substrate and a loop antenna pattern arranged in a loop shape on the substrate.

10. The communication apparatus of claim 9, wherein the loop antenna pattern includes a plurality of antenna patterns confronting each other in a direction intersecting the transport surface of the transport path, and a length between the confronting antenna patterns is smaller than a length between the loop surface and the plurality of side walls of the plurality of boxes in a thickness direction of the substrate.

11. The communication apparatus of claim 2, wherein the loop surface is arranged slantingly with respect to the transport surface of the transport path.

12. The communication apparatus of claim 1, wherein the plurality of reader/writer antennas have a longitudinal direction.

13. The communication apparatus of claim 1, wherein the shield device comprises:
a frame-shaped main body on which one of the plurality of reader/writer antennas is arranged; and
a plurality of frame-shaped spacers arranged adjacent to the main body.

14. The communication apparatus of claim 1, wherein the plurality of shield spaces of the shield device each form an electromagnetic shield space.

15. The communication apparatus of claim 1, wherein the plurality of reader/writer antennas are configured to communicate in different frequency bands from one another.

16. A communication method for communicating with wireless communication devices, comprising:
transporting a sheet on which a plurality of wireless communication devices are arrayed into a shield device that defines a plurality of shield spaces juxtaposed corresponding to an array pitch between the plurality of wireless communication devices arrayed on the sheet wherein the plurality of shield spaces are defined by a plurality of boxes enclosing the sheet, wherein plurality of shield spaces via respective each box of the respective shield space comprises a top surface, a bottom surface, and a plurality of side walls; and
communicating with each wireless communication device arranged in each of the plurality of shield spaces, respectively, by a plurality of reader/writer antennas arranged in each of the plurality of shield spaces,
wherein a part of the shield device is arranged between the plurality of reader/writer antennas, and
wherein the plurality of reader/writer antennas are arranged at a side facing a transport surface of a transport path.

17. The communication method of claim 16, wherein the communicating includes reading and writing inspection data from and to the plurality of wireless communication devices by the plurality of reader/writer antennas, respectively.

18. The communication method of claim 16, wherein the communicating includes measuring an RSSI strength of the plurality of wireless communication device by the plurality of reader/writer antennas, respectively.

19. The communication method of claim 16, wherein the communicating includes encoding the plurality of wireless communication device by the plurality of reader/writer antennas, respectively.

20. The communication method of claim 16, wherein the plurality of reader/writer antennas each include a loop antenna having a loop surface in a direction intersecting the transport surface of the transport path.

* * * * *